US012684416B2

(12) United States Patent
Jamadagni et al.

(10) Patent No.: US 12,684,416 B2
(45) Date of Patent: Jul. 14, 2026

(54) SYSTEM AND METHOD FOR OFFLOADING DEVICES IN A CELLULAR NETWORK

(71) Applicant: JIO PLATFORMS LIMITED, Ahmedabad (IN)

(72) Inventors: Satish Nanjunda Swamy Jamadagni, Bangalore (IN); Mathew Oommen, Mumbai (IN); Pradeep Krishnamurthy Hirisave, Bangalore (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 432 days.

(21) Appl. No.: 18/247,450

(22) PCT Filed: Mar. 3, 2023

(86) PCT No.: PCT/IB2023/051978
§ 371 (c)(1),
(2) Date: Mar. 31, 2023

(87) PCT Pub. No.: WO2023/175431
PCT Pub. Date: Sep. 21, 2023

(65) Prior Publication Data
US 2024/0430748 A1 Dec. 26, 2024

(30) Foreign Application Priority Data
Mar. 14, 2022 (IN) .............................. 202221013824

(51) Int. Cl.
*H04W 28/08* (2023.01)
*H04W 28/086* (2023.01)
(52) U.S. Cl.
CPC ......... *H04W 28/09* (2020.05); *H04W 28/086* (2023.05)

(58) Field of Classification Search
CPC ........... H04W 28/0958; H04W 28/086; H04W 28/09; H04W 28/08; H04W 4/06;
(Continued)

(56) References Cited

U.S. PATENT DOCUMENTS

2003/0119533 A1* 6/2003 Sarkkinen ........... H04L 12/1886
455/500
2014/0003239 A1 1/2014 Etemad et al.
(Continued)

OTHER PUBLICATIONS

International Search Report and Written Opinion issued by the International Searching Authority issued in related Foreign Application No. PCT/IB2023/051978, mailed May 4, 2023 (11 pgs.).

*Primary Examiner* — Anez C Ebrahim
(74) *Attorney, Agent, or Firm* — FINNEGAN, HENDERSON, FARABOW, GARRETT & DUNNER LLP

(57) ABSTRACT

The present disclosure generally relates to a system and method for offloading user equipments and as such, unicast and/or broadcast/multicast content of the user equipments from one broadcast/multicast system to another broadcast/multicast system and vice versa based on multiple criteria. The system collects one or more data parameters from the user equipments in a first network system, identifies a number of the user equipments to be offloaded based on the one or more data parameters, determines whether the identified number of the user equipments meet one or more offloading criteria, and triggers offloading of the identified number of the user equipments from the first network system to a second network system. The system facilitates switching the network system seamlessly without any manual intervention of users and provides continued broadcast/multicast services.

19 Claims, 19 Drawing Sheets

(58) Field of Classification Search
  CPC ......... H04W 28/0983; H04W 28/0867; H04W
                36/144; H04L 12/189; H04H 20/423;
                                        H04H 20/24
  See application file for complete search history.

(56) References Cited

U.S. PATENT DOCUMENTS

| | | | |
|---|---|---|---|
| 2017/0251410 A1* | 8/2017 | Comstock | H04W 36/22 |
| 2017/0295473 A1 | 10/2017 | Zuniga et al. | |
| 2018/0047053 A1* | 2/2018 | Owens | G06Q 30/0277 |
| 2018/0176822 A1* | 6/2018 | Kim | H04W 36/22 |

* cited by examiner

100

200

400

402-1

402-2

402-3

UE
402

NODES
404

NETWORK
406

SYSTEM
410

ENTITY
408

SERVER
412

500

SYSTEM 410

| PROCESSOR(S) 502 | MEMORY 504 | INTERFACE(S) 506 |
|---|---|---|

PROCESSING ENGINE
508

INTELLIGENT DATA COLLECTOR ENGINE
512

DECISION ENGINE
514

OTHER UNIT(S)
516

DATABASE
510

600

1000

START

DATA ANALYTICS USING
INTELLIGENT DATA COLLECTOR
1002

BASED ON - - NUSER >
THNUSER(IS ALSO SUSER), RX
LEVEL >THRX ABOVE
THRESHOLD AND BW SAVED >
THBW USER IN MBS AREA
1004

CONTINUE
1006

IF ABOVE
CRITERIA MET ?
1008

ID ABOVE CRITERIA MET?

TRIGGER ONLOAD
1010

YES

TRIGGER OFFLOAD
1012

SYSTEM AND METHOD FOR OFFLOADING DEVICES IN A CELLULAR NETWORK

RESERVATION OF RIGHTS

A portion of the disclosure of this patent document contains material, which is subject to intellectual property rights such as, but are not limited to, copyright, design, trademark, Integrated Circuit (IC) layout design, and/or trade dress protection, belonging to Jio Platforms Limited (JPL) or its affiliates (hereinafter referred as owner). The owner has no objection to the facsimile reproduction by anyone of the patent document or the patent disclosure, as it appears in the Patent and Trademark Office patent files or records, but otherwise reserves all rights whatsoever. All rights to such intellectual property are fully reserved by the owner.

FIELD OF INVENTION

The embodiments of the present disclosure generally relate to wireless communications technology. In particular, the present disclosure relates to a system and method for offloading or onloading broadcast or multicast sessions to or from a cellular network.

BACKGROUND OF INVENTION

The following description of related art may be intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

Broadcast/Multicast Service, also referred to as, BMS is a method of sharing media content across a set of users using a common set of resources. Traditional broadcast operators, such as television (TV) broadcasters are looking at broadcast through cellular network as a medium along with non-cellular network. Further, Over-the-top (OTT) application providers have also expressed interest in broadcast technologies in cellular networks as well as non-cellular dedicated broadcast channels. In such a scenario, broadcast and/or multicast data streams can be passed through multiple air interface technologies such as, but not limited to, the 3rd Generation Partnership Project (3GPP) evolved Multimedia Broadcast Multicast Services (eMBMS) or Multicast/Broadcast Service (MBS), Digital Video Broadcasting-Handheld (DVB-H), Advanced Television Systems Committee 3.0 (ATSC 3.0), etc.

Existing mechanisms do not enable switching broadcast and/or multicast services across access technologies, and users need to manually choose a broadcast channel as a onetime activity during subscription.

Further, existing 3GPP broadcast solutions require a service provider to reserve a subset of licensed spectrum bought over for a specific purpose, for example, in Fourth Generation (4G), 5 MHz of the licensed spectrum needs to be reserved for eMBMS purpose, which means that the bandwidth available for regular mobile broadband users becomes limited. Such a reservation of radio resources can be very expensive, as it might affect the Quality of Service (QoS) for the existing mobile broadband unicast users.

There is, therefore, a requirement in the art for a system and a method to address the issue of broadcast/multicast offload/onload across multiple channels or access networks based on multiple criteria.

SUMMARY

This section is provided to introduce certain objects and aspects of the present disclosure in a simplified form that are further described below in the detailed description. This summary is not intended to identify the key features or the scope of the claimed subject matter.

In an aspect, the present disclosure provides a system for offloading a user equipment. The system includes one or more processors and a memory operatively coupled to the one or more processors, wherein the memory includes processor-executable instructions, which on execution, causes the one or more processors to collect one or more data parameters from the user equipment, wherein the user equipment is communicatively coupled to the system, identify a number of user equipments to be offloaded based on the one or more data parameters, determine whether the identified number of user equipments meet one or more offloading criteria, and trigger offloading of the identified number of user equipments from a first network system to a second network system based on a determination that the identified number of user equipments meet the one or more offloading criteria.

In an embodiment, the one or more data parameters include at least one of a first count of the number of user equipments in a particular area watching a particular broadcast or multicast content, user equipments that are subscribed to the system, a first threshold corresponding to a second count of the number of user equipments that can save a particular bandwidth, a second threshold corresponding to the saved bandwidth, and a third threshold corresponding to signal strength required for the offloading.

In an embodiment, the one or more offloading criteria include the identified number of user equipments being greater than a first threshold. In an embodiment, the one or more offloading criteria include the identified number of user equipments being subscribed to the system. In an embodiment, the one or more offloading criteria include a bandwidth saved by the identified number of user equipments being greater than a second threshold. In an embodiment, the one or more offloading criteria include a signal strength of the identified number of user equipments being greater than a third threshold.

In an embodiment, the first network system includes a cellular network system, and the second network system includes a non-cellular network system.

In an embodiment, the memory includes processor-executable instructions, which on execution, causes the one or more processors to monitor media content of the user equipment, and decide on type of advertisements to be displayed on the user equipment based on the monitored media content.

In an embodiment, the memory includes processor-executable instructions, which on execution, causes the one or more processors to trigger the offloading by being configured to relay media content, via the system, to the identified number of user equipments. In another embodiment, the memory includes processor-executable instructions, which on execution, causes the one or more processors to trigger the offloading by being configured to communicate an end point node to a content provider of media content for content transmission to the identified number of user equipments.

In an embodiment, the memory includes processor-executable instructions, which on execution, causes the one or more processors to assign a unique identifier to each of the identified number of user equipments upon successful subscription to the system.

In another aspect, the present disclosure provides a method for offloading a user equipment. The method includes collecting, by a processor, one or more data parameters from the user equipment in a first network system, identifying, by the processor, a number of user equipments in the first network system to be offloaded based on the one or more data parameters, determining, by the processor, whether the identified number of user equipments meet one or more offloading criteria, and triggering, by the processor, the offloading of the identified number of user equipments from the first network system to a second network system based on determining that the identified number of user equipments meet the one or more offloading criteria.

In an embodiment, the method includes relaying, by the processor, media content via a broadcast or multicast offload/onload system to the identified number of user equipments. In another embodiment, the method includes communicating, by the processor, an end point node to a content provider of media content for content transmission to the identified number of user equipments.

In another aspect, the present disclosure provides a user equipment in a first network system for offloading broadcast or multicast content. The user equipment includes one or more processors communicatively coupled to an offloading system. The one or more processors of the user equipment are configured to transmit a subscription request to the offloading system, receive a subscription response from the offloading system, wherein the subscription response includes a unique identifier associated to the user equipment, and in response to reception of the subscription response, provide one or more data parameters to the offloading system. The offloading system includes a processor configured to identify the user equipment for offloading based on the one or more data parameters, determine whether the user equipment meets one or more offloading criteria, and trigger offloading of the user equipment from the first network system to a second network system based on a determination that the user equipment meets the one or more offloading criteria.

In an aspect, the present disclosure provides a non-transitory computer readable medium including processor-executable instructions that cause a processor to collect one or more data parameters from a user equipment, identify a number of user equipments to be offloaded based on the one or more data parameters, determine whether the identified number of user equipments meet one or more offloading criteria, and trigger the offloading of the identified number of user equipments from a first network system to a second network system based on a determination that the identified number of user equipments meet the one or more offloading criteria.

OBJECTS OF THE DISCLOSURE

An object of the present disclosure is to offload or onload media sessions across multiple channels or access networks.

An object of the present disclosure is to switch the network systems intelligently and seamlessly without any manual intervention and provide continued broadcast/multicast services to end users.

An object of the present disclosure is to use licensed radio resources efficiently.

An object of the present disclosure is to save radio bandwidth corresponding to offloading of users.

An object of the present disclosure is to provide better Quality of Service to end users.

BRIEF DESCRIPTION OF THE DRAWINGS

The accompanying drawings, which are incorporated herein, and constitute a part of this disclosure, illustrate exemplary embodiments of the disclosed methods and systems in which like reference numerals refer to the same parts throughout the different drawings. Components in the drawings are not necessarily to scale, emphasis instead being placed upon clearly illustrating the principles of the present disclosure. Some drawings may indicate the components using block diagrams and may not represent the internal circuitry of each component. It will be appreciated by those skilled in the art that disclosure of such drawings includes the disclosure of electrical components, electronic components or circuitry commonly used to implement such components.

Figure 1:
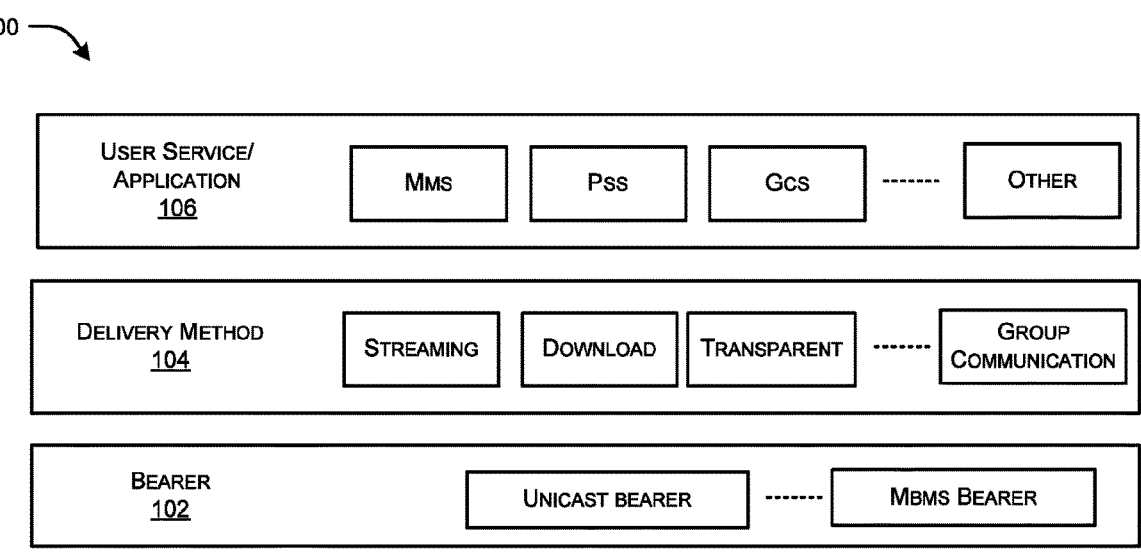
FIG. 1 illustrates an exemplary block diagram highlighting functional layers for the delivery of Multimedia Broadcast Multicast Services (MBMS)-based service.

The foregoing shall be more apparent from the following more detailed description of the disclosure.

DETAILED DESCRIPTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the disclosure as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Reference throughout this specification to "one embodiment" or "an embodiment" or "an instance" or "one instance" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Certain terms and phrases have been used throughout the disclosure and will have the following meanings in the context of the ongoing disclosure.

The term "broadcast" may refer to distribution of audio or video content to a dispersed audience via any electronic mass communications medium, but typically one using an electromagnetic spectrum (radio waves), in a one-to-many model.

The term "multicast" may refer to group communication where data transmission is addressed to a group of destination computers simultaneously. Multicast can be one-to-many or many-to-many distribution.

The term "Broadcast/Multicast Service" is commonly known as BMS. The BMS may refer to a method to share a media content across a set of users using a common set of resources.

The term "3GPP" is a 3rd Generation Partnership Project or 3GPP and is a collaborative project between a group of telecommunications associations with the initial goal of developing globally applicable specifications for Third Generation (3G) mobile systems. 3GPP specifications cover cellular telecommunications technologies, including radio access, core network, and service capabilities, which provide a complete system description for mobile telecommunications. The 3GPP specifications also provide hooks for non-radio access to the core network, and for networking with non-3GPP networks.

The term "Multimedia Broadcast Multicast Services (MBMS)" refers to a point-to-multipoint interface specification for existing 3GPP cellular networks, which is designed to provide efficient delivery of broadcast and multicast services, both within a cell as well as within the core network. For broadcast transmission across multiple cells, it defines transmission via single-frequency network configurations. The specification is referred to as Evolved Multimedia Broadcast Multicast Services (eMBMS) when transmissions are delivered through a Long-Term Evolution (LTE) network. eMBMS is also known as LTE Broadcast.

The term "Content Provider/Multicast Broadcast Source" may provide discrete and continuous media, as well as service descriptions and control data, to a broadcast multi-cast service centre (BM-SC) to offer services at a time.

The term "Access and Mobility Management Function (AMF)" may refer to a functional module which terminates the control plane of different access networks onto the 5G Core Network (5GC) and control which UEs can access the 5GC to exchange traffic with DNs.

The term "5G Network Exposure Function (NEF)" facilitates secure, robust, developer-friendly access to the exposed network services and capabilities of 5G network, enabling third-party developers and enterprises to create and tailor composite or specialized network services on-demand.

FIG. 1 illustrates a typical block diagram (100) depicting distinct functional layers for delivery of MBMS-based services. In particular, FIG. 1 depicts three functional layers for the delivery of MBMS-based services. The three layers may include bearer service (102), delivery method (104), and user service or user application (106).

The first layer may include bearer service (102). A person of ordinary skill in the art will understand that the bearer service (102) provides the mechanism by which Internet Protocol (IP) data may be transported. One such type of bearer may be MBMS bearer which may be used to transport multicast and broadcast traffic in an efficient one-to-many manner and may be the foundation of MBMS-based services. The MBMS bearers may be used jointly with unicast bearers in offering complete service capabilities.

Referring to FIG. 1, the second layer may include delivery method (104). When MBMS content is delivered to a receiving user service or user application, one or more delivery methods (104) may be used such as, but not limited to, download, streaming, transparent, and group communication. The second layer, i.e., the delivery method (104) provides security and key distribution, reliability control by means of forward-error-correction techniques, and associated delivery procedures such as file-repair, delivery verification, and the like. The delivery method(s) (104) may use the bearer service (102) such as, MBMS bearers and unicast bearers (point-to-point bearers) through a set of MBMS associated procedures.

Referring to FIG. 1, the third layer may include user service or user applications (106). Different applications (106) impose different requirements when delivering content to MBMS users and may use different delivery methods (104). For example, a messaging application such as Multimedia Messaging Service (MMS) may use the download delivery method, a streaming application such as Packet-Switched Streaming Service (PSS) may use the streaming delivery method, and a group communications application such as Mission-Critical Push-To-Talk (MCPTT) may use the group communication delivery method. A person of ordinary skill in the art will ascertain that an MBMS user service (106) may use one or several delivery methods (104) simultaneously.

Figure 2:
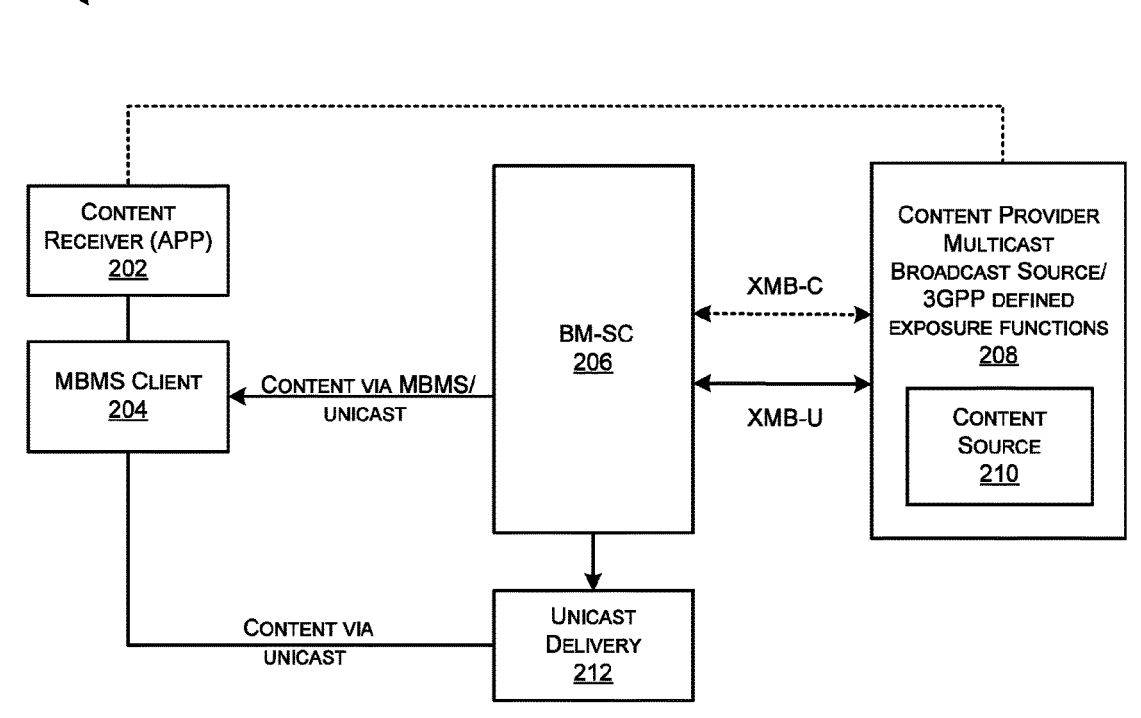
FIG. 2 illustrates an exemplary representation of End-to-End MBMS architecture with xMB reference point.

FIG. 2 illustrates an architecture (200) with xMB reference point, illustrating content delivery from a content provider (208)/content source (210) to an MBMS client (204) via a content receiver application (202). The content provider (208) may provide discrete and continuous media as well as service descriptions and control data to a BM-SC (206) to offer services at a time. In an embodiment, the content provider (208) may provide media formats to the BM-SC (206), typically through an xMB interface and initiates services and sessions through the xMB interface.

Referring to FIG. 2, the content receiver application (202) is an MBMS-aware application, i.e., an application in the user space that communicates with the MBMS client (204)

through Application Programming Interfaces (APIs). The MBMS client (204) may provide APIs and protocol-related methods to expose relevant functionalities to the content receiver application (202).

Further, upon using an xMB reference point, the content provider (208) may invoke procedures supported by BM-SC(s) to setup and manage a MBMS user service from the BM-SC (206) to the MBMS client(s) (204). The BM-SC (206) may define an endpoint with all supported procedures on the xMB interface, which can then be converted to SGmb procedures for the interface between BM-SC (206) and MBMS Gateway (GW). The BM-SC (206) may forward the received content for unicast delivery (212) for appropriate functions to the MBMS client (204). For example, an MBMS user service fallback is a unicast delivery (212).

Further, in 4G and Fifth Generation (5G) networks, the content provider (208) may always be located in the network infrastructure side and the MBMS client (204) and the content receiver application (202) may be located at a UE or a device side. The UE can also act as a content source for the broadcast or the multicast of the content. However, before the UE initiates any content transfer to the BM-SC (206), the UE may have to be authenticated by the BM-SC (206).

Figure 3A:
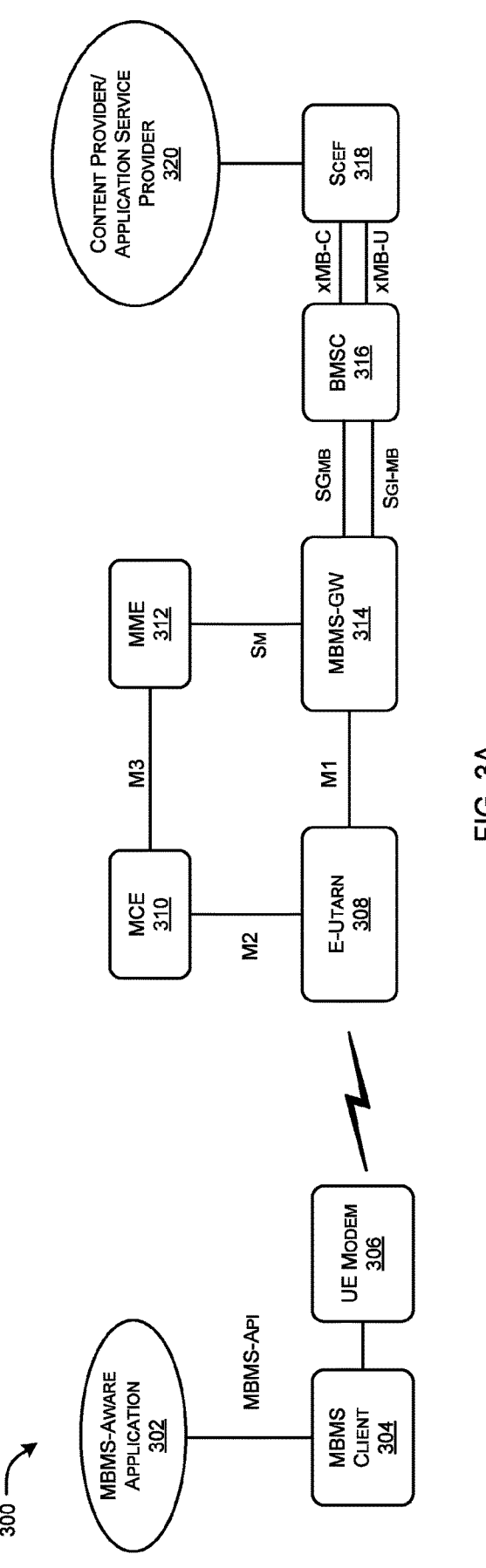
FIG. 3A illustrates an exemplary representation of End-to-End eMBMS for 4G networks, in accordance with embodiments of the present disclosure.

FIG. 3A illustrates an End-to-End eMBMS Architecture (300) for 4G Networks. In addition, on similar lines and with respect to FIG. 3B, a prospective End-to-End MBMS Architecture (330) for 5G networks is illustrated.

In particular, FIG. 3A depicts a content provider or an application service provider (320) providing content to an MBMS client (304). The MBMS client (304) is associated with a UE modem (306), which is further coupled to an Evolved UMTS Terrestrial Radio Access Network (E-UTRAN) (308). The E-UTRAN (308) is associated with a Multicast Coordination Entity (MCE) (310) and the MCE (310) may be further connected to an MBMS-GW (314) through a mobility management entity (MME) (312). Using the xMB reference point, the content provider (320) may invoke procedures supported by a BM-SC (316) to setup and manage a MBMS user service from the BM-SC (316) to the MBMS client (304). The BM-SC (316) is an endpoint connecting the MBMS-GW (314) and a Service Capability Exposure Function (SCEF) (318).

Figure 3B:
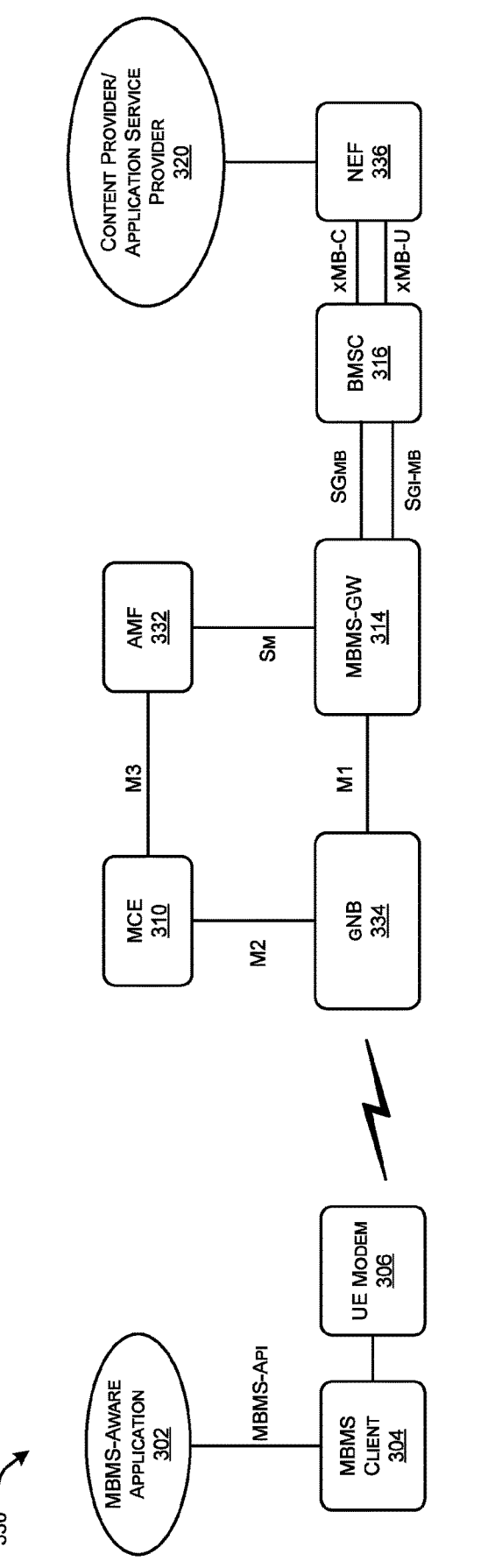
FIG. 3B illustrates an exemplary representation of End-to-End eMBMS for 5G networks, in accordance with embodiments of the present disclosure.

On similar lines, in FIG. 3B, the MME (312) is replaced by an Access Mobility Function module (AMF) (332), the E-UTRAN (308) by a gNodeB (334), and the SCEF (318) by an NEF (336) for 5G networks.

The existing 3GPP broadcast solutions require a service provider to reserve a subset of licensed spectrum bought over for a specific purpose. However, in such a scenario, the bandwidth available for a regular mobile broadband user becomes limited.

Further, broadcast bands have remained unused due to the non-usage of digital terrestrial TV for substantial periods of time. In addition, existing solutions do not provide a mechanism to switch broadcast/multicast services across access technologies because of which users have to manually choose a broadcast channel as a onetime activity during subscription. The existing technologies and methodologies do not solve the above-mentioned concerns.

Therefore, the present disclosure relates to a Broadcast/Multicast Offload/Onload System (BMOS) that enables offloading/onloading unicast and/or broadcast/multicast data streams or sessions from one broadcast/multicast system to another and vice versa based on multiple factors including, but not limited to, subscription data, user interests, medium/channel availability, etc.

Further, the disclosed solution enables switching the medium seamlessly without any manual intervention of users and provides continued broadcast/multicast services. Thus, the present disclosure enables efficient usage of licensed radio resources as there is no need to reserve the radio resources. Further, due to offloading of certain unicast users, radio bandwidth is saved and finally, better QoS is provided to the users.

The various embodiments throughout the disclosure will be explained in more detail with reference to FIGS. 4-13.

Figure 4:
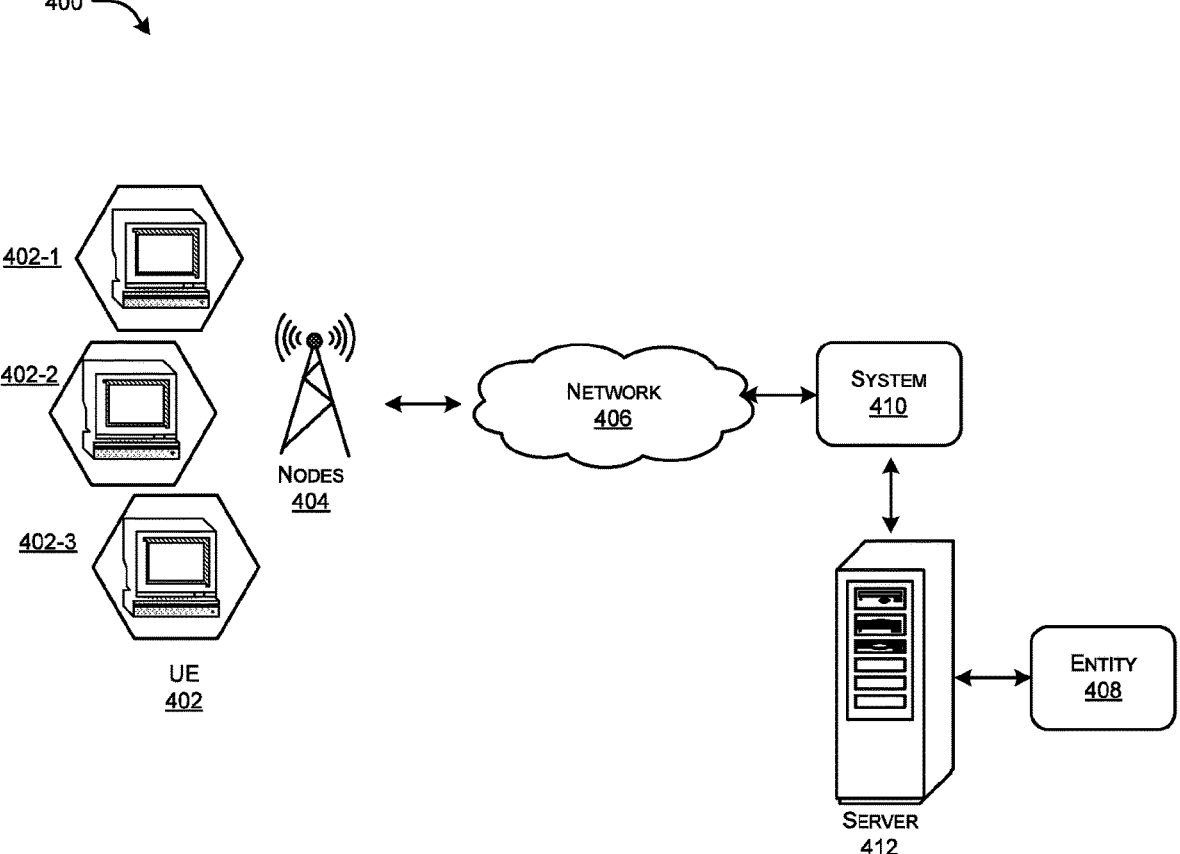
FIG. 4 illustrates an exemplary network architecture in which or with which a system of the present disclosure may be implemented, in accordance with embodiments of the present disclosure.

FIG. 4 illustrates an exemplary network architecture (400) in which or with which a BMOS (410) (hereinafter referred as system) of the present disclosure may be implemented. As illustrated, the network architecture (400) includes the system (410) for offloading/onloading unicast and/or broadcast/ multicast data streams or sessions from one broadcast/ multicast system to another and vice versa in a network (406) based on multiple factors including, but not limited to, subscription data, user interests, medium/channel availability, etc. In an embodiment, the system (410) broadcasts or multicasts content in the network (406) to users associated with one or more computing devices or UE (402-1, 402-2 . . . 402-N) (individually referred to as the UE (402) and collectively referred to as the UEs (402)).

Referring to FIG. 4, the system (410) may be operatively coupled to a centralised server (412) associated with an entity (408). In another exemplary embodiment, the centralized server (412) may include or comprise, by way of example but not limitation, one or more of a standalone server, a server blade, a server rack, a bank of servers, a server farm, hardware supporting a part of a cloud service or system, a home server, hardware running a virtualized server, one or more processors executing code to function as a server, one or more machines performing server-side functionality as described herein, at least a portion of any of the above, some combination thereof. In an embodiment, the entity (408) may include, but is not limited to, a vendor, a network operator, a company, an organization, a university, a lab facility, a business enterprise, a defence facility, or any other facility that provides content.

Further, the system (410) may be communicatively coupled to the one or more UEs (402) via the network (406) having a plurality of nodes (404). In an embodiment, the network (406) may include at least one of a 4G network, a 5G network, and the like.

In an exemplary embodiment, the network (406) may include, by way of example but not limitation, at least a portion of one or more networks having one or more nodes that transmit, receive, forward, generate, buffer, store, route, switch, process, or a combination thereof, etc. one or more messages, packets, signals, waves, voltage or current levels, some combination thereof, or so forth. The network (406) may also include, by way of example but not limitation, one or more of a wireless network, a wired network, an internet, an intranet, a public network, a private network, a packet-switched network, a circuit-switched network, an ad hoc network, an infrastructure network, a Public-Switched Telephone Network (PSTN), a cable network, a cellular network, a satellite network, a fiber optic network, or some combination thereof.

In an embodiment, the system (410) may support multicast/broadcast offload from cellular networks to non-cellular broadcast networks and vice versa. The system (410) may include an offload/onload functionality or entity consisting primarily of a broadcast offload/onload decision entity (not shown in FIG. 4), which is responsible for deciding if a unicast/broadcast session must be offloaded to a fiber or a wired connection. In an embodiment, the system (410) may further include an intelligent data collection entity (including access network monitoring) (not shown in FIG. 4) that interfaces with underlying broadcast/unicast networks enforcing the decisions made by the broadcast offload/ onload decision entity. In an embodiment, the system (410) may include a mapping entity (not shown in FIG. 4) to link cellular network sessions to a broadcast session in a non-cellular network (back-channel linking). In particular, the mapping entity associates a broadcast network user to a cellular network uplink channel. In an embodiment, the system (410) may include a monitoring entity (not shown in FIG. 4) that monitors the content type and decides on insertion and type of advertisements (ads). In an embodiment, the system (410) may be implemented in, but is not limited to, an electronic device, a mobile device, a server, and the like. Such server may include, but not limited to, a standalone server, a remote server, a cloud server, dedicated server, and the like.

Referring to FIG. 4, in some embodiments, the UEs (402) may include, but are not limited to, a handheld wireless communication device (e.g., a mobile phone, a smart phone, a phablet device, and so on), a wearable computer device (e.g., a head-mounted display computer device, a head-mounted camera device, a wristwatch computer device, and so on), a Global Positioning System (GPS) device, a laptop computer, a tablet computer, or another type of portable computer, a media playing device, a portable gaming system, and/or any other type of computer device with wireless communication capabilities, and the like. In an embodiment, the UEs (402) may communicate with the system (410) via set of executable instructions residing on any operating system. In an embodiment, the UEs (402) may include, but are not limited to, any electrical, electronic, electro-mechanical or an equipment or a combination of one or more of the above devices such as virtual reality (VR) devices, augmented reality (AR) devices, laptop, a general-purpose computer, desktop, personal digital assistant, tablet computer, mainframe computer, or any other computing device, wherein the computing device may include one or more in-built or externally coupled accessories including, but not limited to, a visual aid device such as camera, audio aid, a microphone, a keyboard, input devices for receiving input from a user such as touch pad, touch enabled screen, electronic pen and the like. It may be appreciated that the UEs (402) may not be restricted to the mentioned devices and various other devices may be used.

In some embodiments, one of the UEs (402) may function as a content provider or a content source. In another implementation, the entity (408) may provide the content via the system (410) to the UEs (402). In yet another embodiment, the UEs (402) may function as content receivers.

In some embodiments, the network (406) may include a plurality of nodes (404) such as, but not limited to, base stations or other access points that provide wireless connectivity to a corresponding plurality of cells (not shown in FIG. 4). A person of ordinary skill in the art will ascertain that the geographic extent of actual cells may depend on factors including, but not limited to, geography, topology, environmental conditions, transmission powers, or transmission power distributions and may therefore be irregular or time-variable. In an embodiment, the plurality of nodes (404) can be any or a combination of eNodeBs and small cells but not limited to the like.

In some embodiments, the network (406) may include a controller (not shown in FIG. 4) that may be used to configure the cells for unicast transmissions or multicast/ broadcast transmissions such as transmissions of a MBMS. As used herein, the term "multicast" may be used to refer to transmission of information over a channel or group of channels that can be received or accessed by multiple users such as the UEs (402) that subscribe to the MBMS. As used herein, the term "broadcast" may also be used to refer to transmission of information over a channel or group of channels that can be received or accessed by multiple UEs (402). Broadcasting and multicasting may be distinguished at least in part because multicasting may provide the capability for forming multicast groups of users. As used herein, the term "broadcast/multicast session" should be understood to refer to a session that can be used to carry broadcast or multicast transmissions. Examples of broadcast/multicast sessions may include, but are not limited to, MBMS sessions or eMBMS sessions. Furthermore, the broadcast/multicast session does not necessarily carry either broadcast or multicast transmissions at any particular time because the transmissions may depend on the available programming and the choices made by individual users. Broadcasting or multicasting can be contrasted with unicasting, in which information may be transmitted from a base station or access point to a single user and other users are not authorized or able to access the unicast information. Cells may broadcast or unicast data to users such as the UEs (402). As used herein, the term "user" may refer to wireless devices such as UE (402) or to a person using the UE (402).

Wireless communication standards such as Long-Term Evolution (LTE, LTE-Advanced, 4G, Next Generation (New Radio (NR), 5G, or the like, may support broadcasting services such as the MBMS or the eMBMS. The MBMS services broadcast or multicast data from base stations over the air interface on channels that can be received by one or more UEs (402). The eMBMS may be an enhanced version of MBMS that provides additional features such as an architecture and physical layer enhancements that allow the eMBMS service to carry multimedia information to the UEs (402). The eMBMS service may transmit information towards the UE (402) by broadcasting or multicasting to the UE (402) in a Multicast Broadcast Single Frequency Network (MB-SFN) mode. An SFN may be generally understood to be a broadcast network where more than one transmitter simultaneously or concurrently sends the same signal over the same frequency channel. The MB-SFN mode may be used to transmit the same information from all of the base stations in a selected group of cells or coverage area. Each of the base stations in the MB-SFN area transmits the same content time-aligned in the same resource blocks of the physical layer. Constructive combination of the signals transmitted by the different base stations in the MB-SFN area enhances the received signal strength and reduces interference within the cells of the MB-SFN area.

Although FIG. 4 shows exemplary components of the network architecture (400), in other embodiments, the network architecture (400) may include fewer components, different components, differently arranged components, or additional functional components than depicted in FIG. 4. Additionally, or alternatively, one or more components of the network architecture (400) may perform functions described as being performed by one or more other components of the network architecture (400).

For instance, the network architecture (400) may include a number of layers (not shown in FIG. 4) including, but are not limited to, a network platform (e.g., servers, databases), network infrastructure (e.g., fiber networks, cellular towers, cable networks, switches), computing devices (e.g., client devices, computers, smartphones, tablets), operating systems, applications (e.g., social network applications, e-commerce applications, third-party applications, operators' applications, carriers' applications), and the like. The network platform may provide content and services to UEs through the network infrastructure and the computing devices. The computing devices may include device hardware (e.g., computers, smartphones, and tablets) and may be associated with particular data plans provided by one or more network operators.

Figure 5:
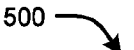
FIG. 5 illustrates an exemplary detailed representation of a computer system in which or with which embodiments of the present disclosure can be utilized, in accordance with embodiments of the present disclosure.

Further, in an embodiment, the system (410) may include one or more processors coupled with a memory, wherein the memory may store instructions which when executed by the one or more processors may cause the system (410) to perform offloading/onloading of broadcasting or multicasting content in networks. An exemplary representation of the system (410) for such purpose, in accordance with embodiments of the present disclosure, is shown in FIG. 5. In an embodiment, the system (410) may be implemented in a non-transitory computer readable medium including processor-executable instructions that may cause one or more processor(s) (502) to perform the steps of the method disclosed herein. In an embodiment, the system (410) may include the one or more processor(s) (502). The one or more processor(s) (502) may be implemented as one or more microprocessors, microcomputers, microcontrollers, edge or fog microcontrollers, digital signal processors, central processing units, logic circuitries, and/or any devices that process data based on operational instructions. Among other capabilities, the one or more processor(s) (502) may be configured to fetch and execute computer-readable instructions stored in a memory (504) of the system (410). The memory (504) may be configured to store one or more computer-readable instructions or routines in a non-transitory computer readable storage medium, which may be fetched and executed to create or share data packets over a network service. The memory (504) may comprise any non-transitory storage device including, for example, volatile memory such as Random-Access Memory (RAM), or non-volatile memory such as Electrically Erasable Programmable Read-only Memory (EPROM), flash memory, and the like.

In an embodiment, the system (410) may include an interface(s) (506). The interface(s) (506) may comprise a variety of interfaces, for example, interfaces for data input and output devices, referred to as input/output (I/O) devices, storage devices, and the like. The interface(s) (506) may facilitate communication for the system (410). The interface(s) (506) may also provide a communication pathway for one or more components of the system (410). Examples of such components include, but are not limited to, processing unit/engine(s) (508) and a database (510).

The processing unit/engine(s) (508) may be implemented as a combination of hardware and programming (for example, programmable instructions) to implement one or more functionalities of the processing engine(s) (508). In examples described herein, such combinations of hardware and programming may be implemented in several different ways. For example, the programming for the processing engine(s) (508) may be processor executable instructions stored on a non-transitory machine-readable storage medium and the hardware for the processing engine(s) (508) may comprise a processing resource (for example, one or more processors), to execute such instructions. In the present examples, the machine-readable storage medium may store instructions that, when executed by the processing resource, implement the processing engine(s) (508). In such examples, the system (410) may include the machine-readable storage medium storing the instructions and the processing resource to execute the instructions, or the machine-readable storage medium may be separate but accessible to the system (410) and the processing resource. In other examples, the processing engine(s) (508) may be implemented by electronic circuitry. In an aspect, the database (510) may comprise data that may be either stored or generated as a result of functionalities implemented by any of the components of the processor (502) or the processing engines (508).

The processing engine (508) may include one or more modules/engines such as, but not limited to, an intelligent data collector engine (512), a broadcast offload/onload decision engine (514) (hereinafter referred as decision engine (514), and other unit(s) or engine(s) (516).

In an embodiment, the system (410) may support multicast/broadcast offload from cellular networks to non-cellular broadcast networks and vice versa. In an embodiment, the intelligent data collector engine (512) may collect necessary data such as, but not limited to, data from UEs that are connected and subscribed to the system (410), data from access network entity or core network entity, data from content providers, or the like.

In an embodiment, the intelligent data collector engine (512) may collect data such as, but not limited to, number of users under a given area watching a particular content ($N_{User}$), whether a user is subscribed to the system (410), i.e., for offload or onload functionality ($S_{User}$), whether a particular content is subscribed to the system (410), i.e., for offload or onload functionality ($S_{cp}$), whether signal strength as perceived by a user or UE is sufficient for the particular content to be offloaded over a period of time ($UE_{rsrp}$), total bandwidth saved due to offload, technology supported by a UE, end user initiated actions, and the like.

In an embodiment, based on the data collected by the intelligent data collector engine (512), the decision engine (514) may use data analytics for analysing the collected data. In an embodiment, the one or more processor(s) (502) may be configured to identify a number of users for offloading based on the collected data and determine whether the identified number of the users meet one or more offloading criteria. In an embodiment, the decision engine (514) may facilitate the one or more processor(s) (502) to determine whether the number of users under a given area watching a particular content ($N_{User}$) (also subscribed to the system (410) is greater than a threshold of users ($ThN_{User}$), such that bandwidth saved (Bw) is greater than a threshold for bandwidth (ThBw). Further, in an embodiment, the one or more processor(s) (502) may be configured to determine whether signal strength as perceived by UEs associated with the users (Rx) is greater than a threshold for the signal strength (ThRx). If the one or more offloading criteria, such as mentioned above, are met, the one or more processor(s) (502) may be configured to offload the identified number of the users from one network to another via the system (410).

In an embodiment, based on the data collected by the intelligent data collector engine (512) and the decisions made by the decision engine (514), the one or more processor(s) (502) may be configured to offload users or as such, data from, for example, 3GPP unicast to non-3GPP broadcast network or from 3GPP broadcast to non-3GPP broadcast network, and vice versa.

Referring to FIG. 5, in an embodiment, the other engine(s) (516) may include an ad insertion engine, a mapping engine, and so on (not shown in FIG. 5). In an embodiment, the ad insertion engine (not shown in FIG. 5) may refer to an entity that monitors the content type watched by end users and decide on insertion and type of ads to the end users. In an embodiment, the mapping engine (not shown in FIG. 5) may refer to an entity that links cellular network sessions to a broadcast session in a non-cellular network. In another embodiment, the mapping engine associates a broadcast network user to a cellular network uplink channel.

In an embodiment, the network architecture (500) may be modular and flexible to accommodate any kind of changes in the system (410) as proximate processing may be acquired towards re-estimating of stock. The system (410) configuration details can be modified on the fly. In an embodiment, the system (410) may be remotely monitored and the data, application, and physical security of the system (410) may be fully ensured. In an embodiment, the data may get collected meticulously and deposited in a cloud-based data lake to be processed to extract actionable insights. Therefore, the aspect of predictive maintenance can be accomplished.

Figure 6:
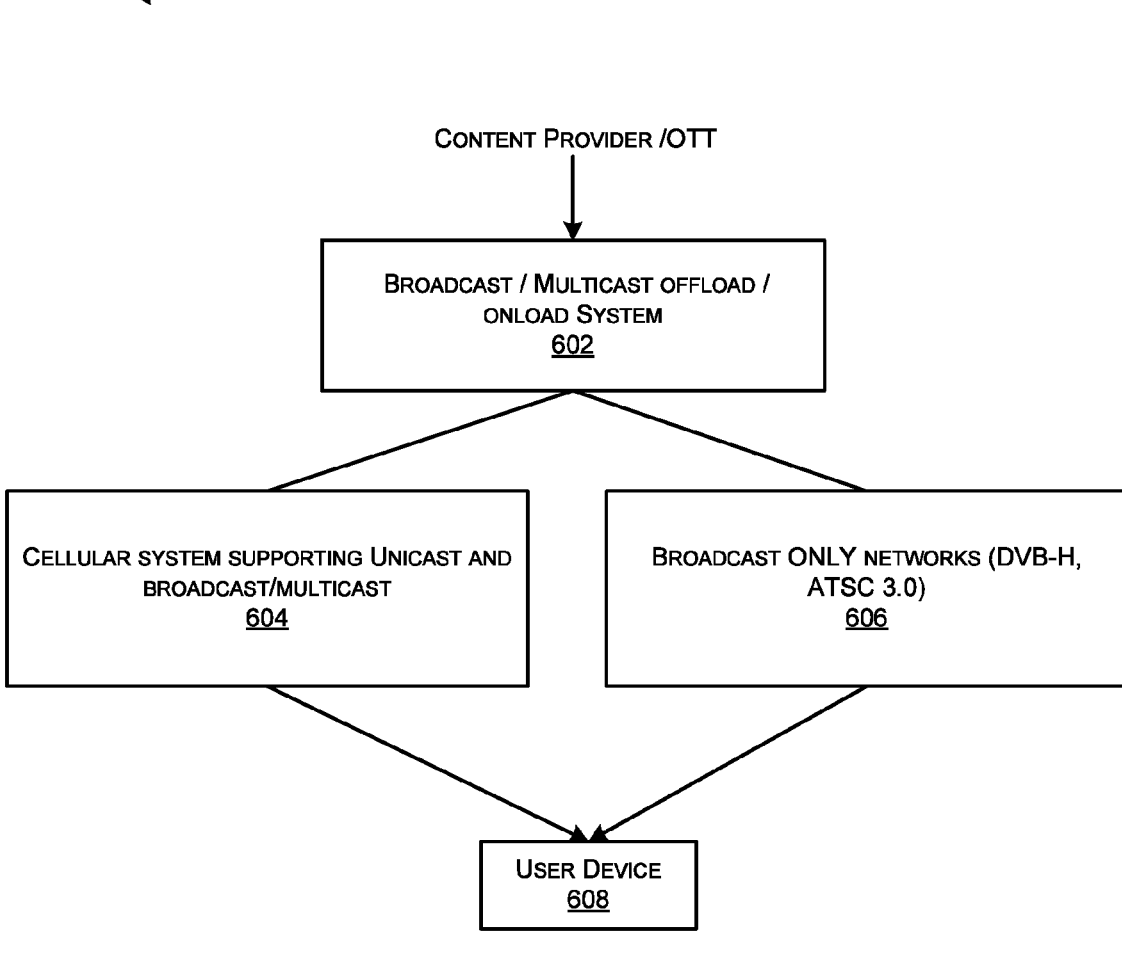
FIG. 6 illustrates an exemplary system flow diagram that supports broadcast/multicast offload from cellular networks to non-cellular broadcast networks and vice versa, in accordance with embodiments of the present disclosure.

FIG. 6 illustrates an exemplary representation (600) in which or with which a system, such as the BMOS (410) of FIGS. 4 and 5 may be implemented, in accordance with an embodiment of the present disclosure.

As illustrated in FIG. 6, a content provider/OTT provides content to a user device (608) via the BMOS (602). A person of ordinary skill in the art will understand that the user device (608) is similar to the UE (402) of FIG. 2 in its functionality, and therefore, may not be described again in detail for the sake of brevity.

In an embodiment, based on data collected by the BMOS (602), the BMOS (602) decides whether the content provided by the content provider/OTT is offloaded from a cellular system supporting unicast and broadcast/multicast (604) to a broadcast only network (606) and vice versa. In an embodiment, the broadcast only network (606) may include, but is not limited to, DVB-H, ATSC 3.0, and so on.

In this way, the BMOS (602) decides whether a particular content watched by a user device (608) needs to be offloaded from cellular networks to non-cellular broadcast networks and vice versa. Further, the BMOS (602) enables switching the medium seamlessly without any manual intervention of users and provides continues broadcast/multicast services.

Figure 7:
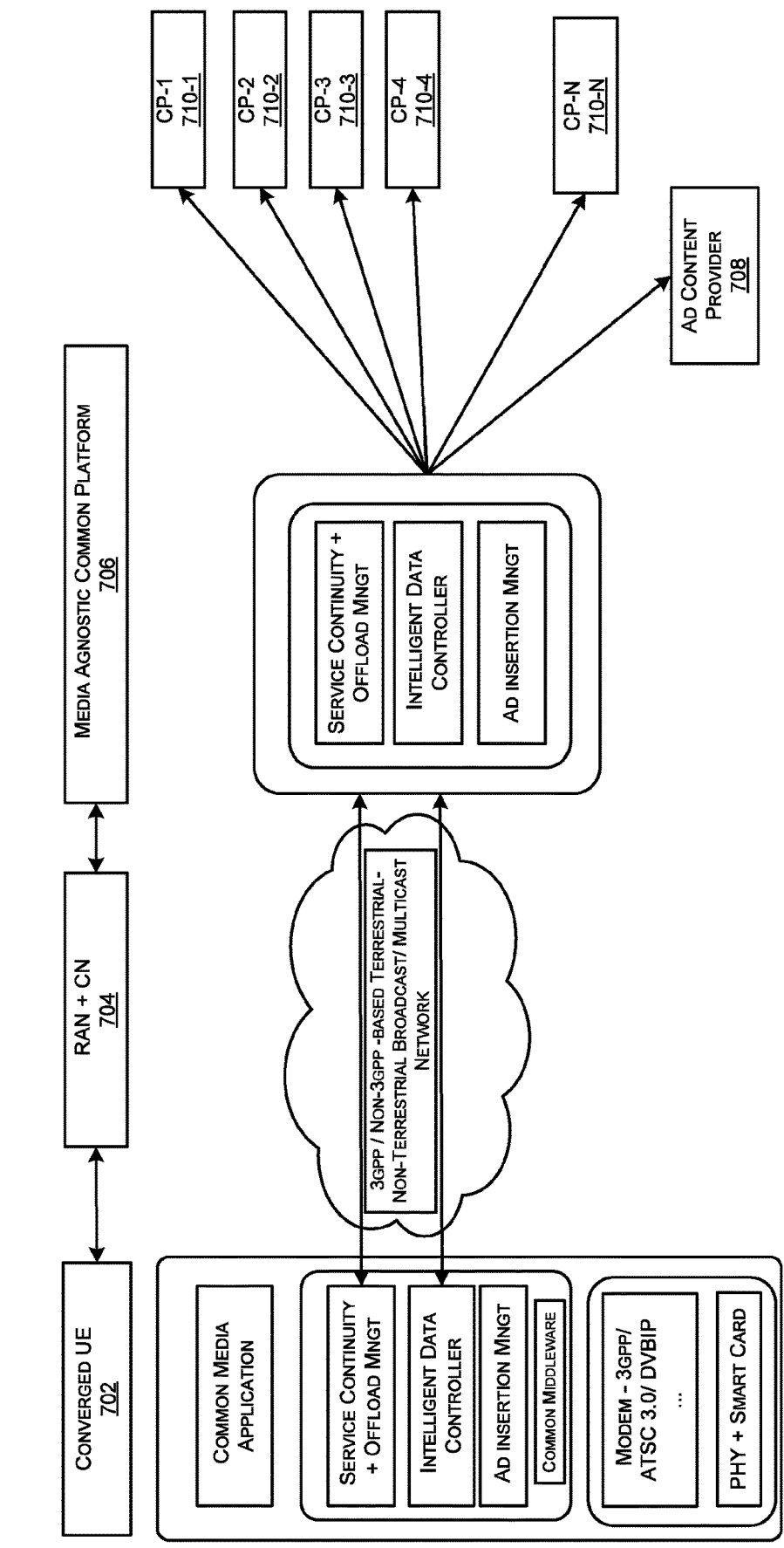
FIG. 7 illustrates an exemplary architecture for transferring media stream from content providers to an end user(s) via a Broadcast/Multicast Offload/Onload System (BMOS), in accordance with embodiments of the present disclosure.

FIG. 7 illustrates an exemplary architecture (700) for transferring media stream from content providers to an end user(s) via a BMOS, in accordance with embodiments of the present disclosure.

With reference to FIG. 7, the architecture (700) may include content provider (CP) (710-1, 710-2, 710-3, 710-4 . . . 710-N) (individually referred to as the CP (710) and collectively referred to as the CPs (710)). In an embodiment, as discussed before, the CPs (710) provide media content to an end user associated with a user device such as, converged UE (702). In an embodiment, the CPs (710) provide media content to the UE (702) via a media agnostic common platform (706). In an embodiment, the media agnostic common platform (706) may include service continuity and offload management module, such as the BMOS (410) of FIGS. 4-5, an intelligent data controller, such as the intelligent data collector engine (512) of FIG. 5, and an ad insertion management module.

As shown in FIG. 7, the converged UE (702) may include a common media application, a common middleware including a service continuity and offload management module, an intelligent data controller, and an ad insertion management module. Further, the UE (702) may include a modem, and physical and smart card. In an embodiment, the converged UE (702) is bi-directionally connected to the media agnostic common platform (706) over a radio access network (RAN) and core network (CN) (704), which includes a 3GPP/non- 3GPP based terrestrial/non-terrestrial broadcast/multicast network. The broadcast network may be 3GPP based or non-3GPP based like ATSC, DVB-IP network or even non-terrestrial based network.

In an embodiment, the service continuity and offload management module of the common middleware at the converged UE (702) may act as a subscription management entity in addition to collecting data from the UE (702). The common middleware residing in the UE (702) subscribes to the media agnostic common platform (706), where a unique identifier (ID) may be assigned to the UE (702) along with a middleware ID.

In an embodiment, the service continuity and offload management module takes decision on whether a media content shall be offloaded to another dedicated broadcast/multicast system or move back to a cellular network, i.e., to a unicast data transfer or a broadcast session. Further, in an embodiment, the intelligent data collector collects necessary data such as, but not limited to, data from the converged UE (702), data from RAN, CN (704), CPs (710), or the like. Furthermore, in an embodiment, the ad insertion management module monitors type of the media content watched on the converged UE (702) and decides on insertion and type of ads to the converged UE (702). In an embodiment, an ad content provider (708) provides ads to the ad insertion management module, based on which the ad insertion module decides on the insertion and the type of ads to be sent to the converged UE (702).

In an embodiment, the architecture (700) may be modular and flexible to accommodate any kind of changes.

Figure 8:
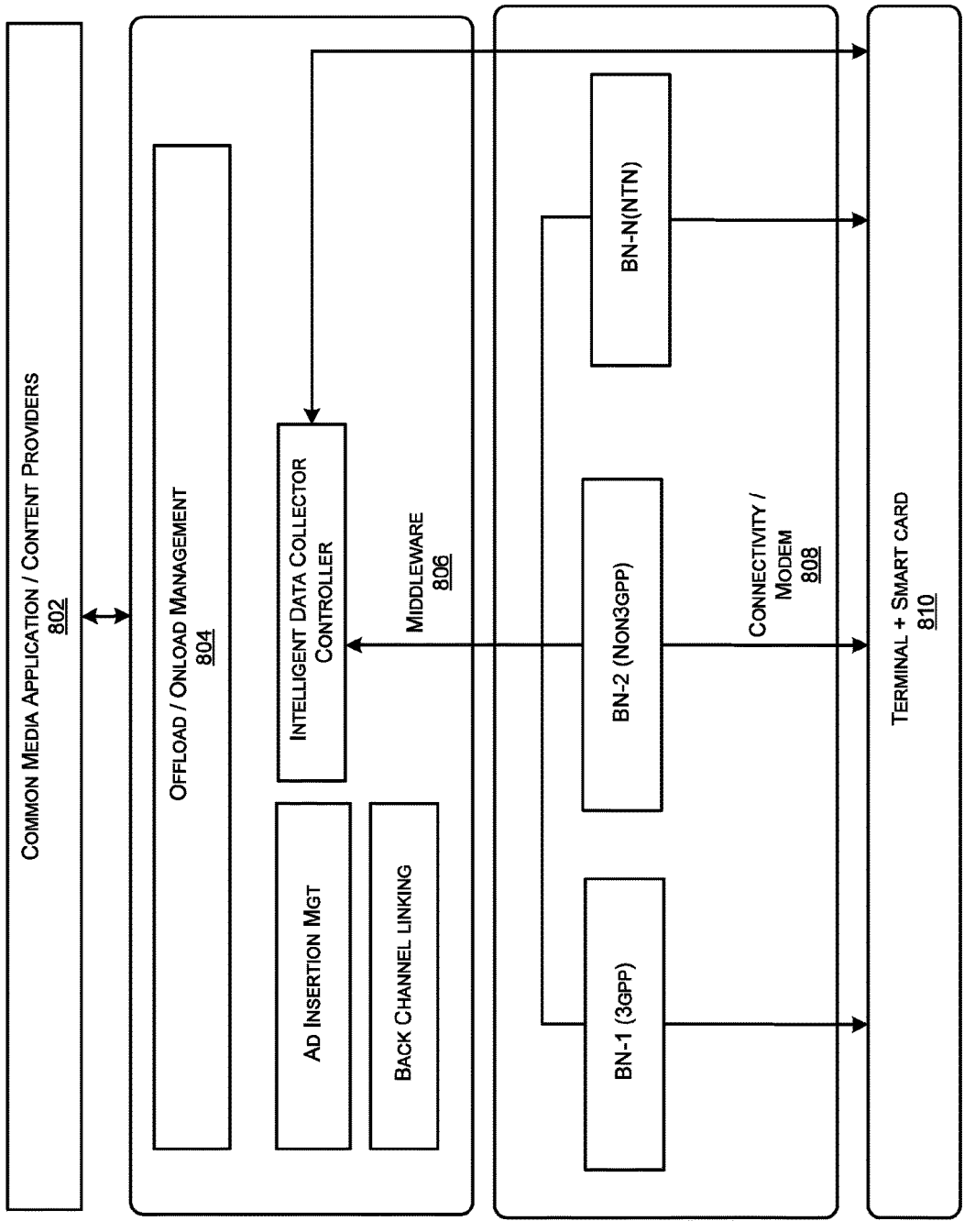
FIG. 8 illustrates an exemplary block diagram of a system architecture for transferring media stream from content providers to an end user(s), in accordance with embodiments of the present disclosure.

FIG. 8 illustrates an exemplary block diagram of a system architecture (800) for transferring media stream from content providers to an end user(s), in accordance with embodiments of the present disclosure.

As illustrated, common media application or content providers (802) provide media content to a terminal (810) via broadcast offload/onload management module, such as BMOS (804). The BMOS (804) may include an intelligent data collector controller, such as the intelligent data collector engine (512) of FIG. 5, back channel linking module, and an ad insertion management module. In an embodiment, an association is maintained between a downlink broadcast channel in one radio access technology and an uplink channel in another cellular radio technology. In particular, the uplink channel is used by the content providers (802) to provide data relevant for service. Because of the presence of the ad insertion management module in the BMOS (804), if an end user clicks on an advertisement to purchase a certain product or to get more information on the same, an association needs to be made on the uplink data being processed to the downlink broadcast.

Further, as discussed above with reference to FIG. 7, the BMOS (804) may include a peer device as a common middleware (806) at the terminal (810). In particular, the middleware (806) at the terminal (810) may subscribe to the BMOS (804). In such a scenario, a unique ID and a middleware ID is allocated to the terminal (810).

Referring to FIG. 8, the media content is provided to the terminal (810) through a connectivity medium or modem (808). The connectivity medium or modem (808) may include a Broadcast Network (BN-1) (3GPP), a BN-2 (non-3GPP), BN-N Non-Terrestrial Networks (NTN), and a unicast network. In an embodiment, the BMOS (804) decides whether a broadcast/multicast session shall be offloaded from one network to another based on data collected by the intelligent data collector controller of the BMOS (804). In an exemplary implementation, the offloading may be done via at least two methods including, relay method and transparent method, but not limited to the like.

In the relay method, once the BMOS (804) has decided to offload a broadcast/multicast session from one network system to another network system, data packets of media content are routed via the BMOS (804), and thus, the data packets are relayed. To this effect, the data packets are either routed or alternatively IP-in-IP encapsulation shall be done.

In the transparent method, once the BMOS (804) has decided to offload a broadcast/multicast session from one system to another system, data packets are transparently sent without the knowledge to the BMOS (804) to the terminal (810). For example, after establishing a right route based on traffic needs, the BMOS (804) may communicate a right end point node to the content provider (802). Thereafter, the content provider (802) may start the data packet transmission and manage the same henceforth until next communication on routing is obtained from the BMOS (804). In the transparent method, since the data packets are not being relayed by the BMOS (804), the BMOS (804) may not have any direct way to keep track of the data being sent to an end user. Thus, in this method, the BMOS (804) needs to gain access to such data in an indirect way from various components in an entire ecosystem, such as from the middleware (806) residing at the terminal (810), content provider (802), and other modules present in the 3GPP or non-3GPP architectural components.

In an exemplary embodiment, the choice of selecting the offloading method is left to service provider's implementation. A person of ordinary skill in the art will ascertain that the architecture (800) may be modular and flexible to accommodate any kind of changes.

Figure 9:
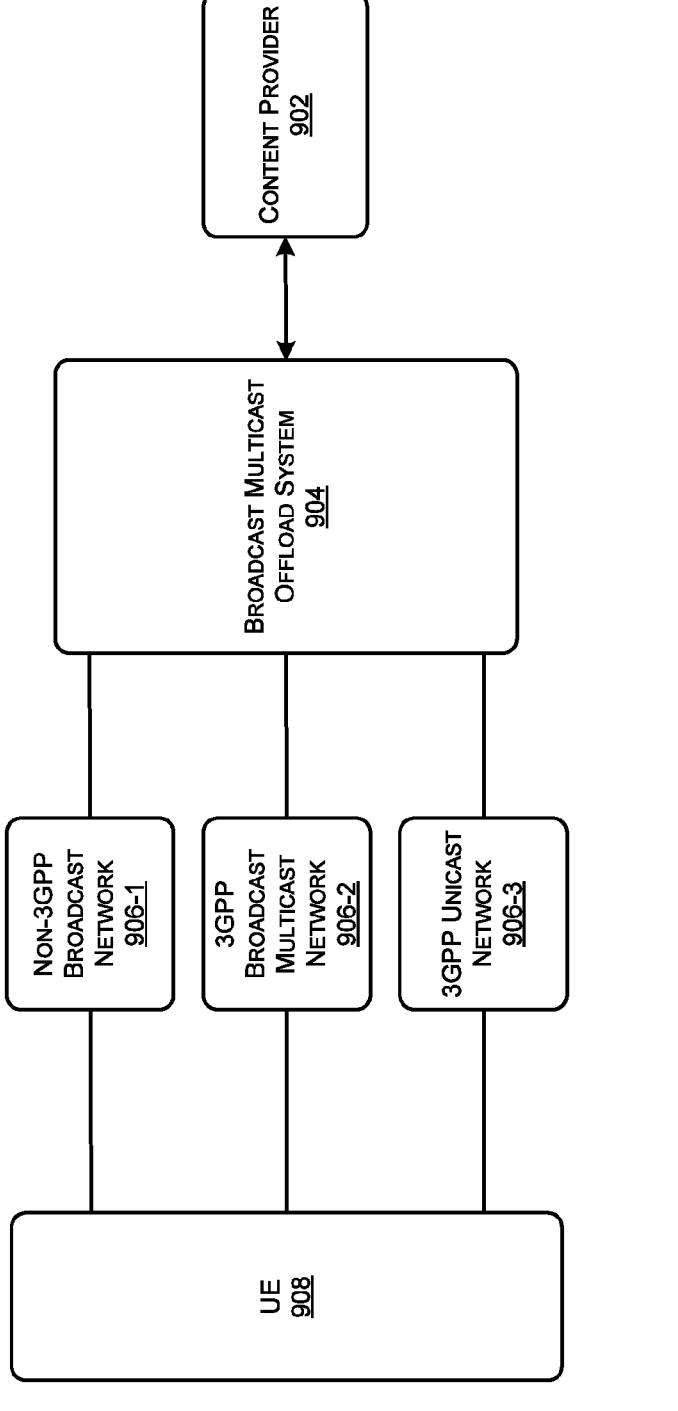
FIG. 9 illustrates another exemplary representation of a BMOS architecture, in accordance with embodiments of the present disclosure.

FIG. 9 illustrates another exemplary representation of a BMOS architecture (900), in accordance with embodiments of the present disclosure. A person of ordinary skill in the art will ascertain that the BMOS (904) is similar in its functionality with the BMOS described with reference to FIGS. 4-8, and hence, may not be described extensively again for the sake of brevity.

Referring to FIG. 9, the BMOS (904) provides media content from content providers (902) to a UE (908) through one of the networks such as, but not limited to, non-3GPP broadcast network (906-1), 3GPP broadcast/multicast network (906-2), and 3GPP unicast network (906-3). In an embodiment, as discussed above, the BMOS (904) collects data from each entity of the architecture (900), analyses the data, and decides whether the media content is to be offloaded from one network system to another network system, i.e., from among (906-1, 906-2, or 906-3) in order to overcome the problems and concerns of the conventional solutions.

As discussed above with reference to FIG. 8 above, the offloading may be done either via a relay method or a transparent method. The description related to these methods has been described with reference to FIG. 8 above, and therefore, may not be described extensively again for the sake of brevity.

Figure 10:
FIG. 10 illustrates an exemplary method flow diagram depicting a method for offloading/onloading user(s), in accordance with embodiments of the present disclosure.

FIG. 10 illustrates an exemplary method flow diagram depicting a method (1000) for offloading/onloading media sessions, in accordance with embodiments of the present disclosure.

As illustrated, at step (1002) of the method (1000), an intelligent data collector engine, such as described above with reference to FIG. 5, may collect necessary data including, but not limited to, data from UEs that are connected and subscribed to a BMOS, data from access network entity or core network entity, data from content providers, or the like.

In an embodiment, the intelligent data collector engine may collect data such as, but not limited to, number of users under a given area watching a particular content ($N_{User}$), whether a user is subscribed to the BMOS, i.e., for offload or onload functionality ($S_{User}$), whether a particular content is subscribed to the BMOS, i.e., for offload or onload functionality ($S_{cp}$), whether signal strength as perceived by a UE is sufficient for the particular content to be offloaded over a period of time ($UE_{rsrp}$), total bandwidth saved due to offload, technology supported by a UE, end user initiated actions, and the like. In an embodiment, at step (1002), the method (1000) may include analysing the data collected by the intelligent data collector engine in order to identify a number of the users to be offloaded.

Referring to FIG. 10, at step (1004), the method (1000) may include determining whether the identified number of the users meet one or more offloading criteria. In an embodiment, the method (1000) may include determining whether the identified number of the users under a given area watching a particular content ($N_{User}$) (also subscribed to the BMOS) is greater than a threshold of users ($ThN_{User}$) (also referred as a first threshold herein), such that bandwidth saved (Bw) is greater than a threshold for bandwidth (ThBw) (also referred as a second threshold herein). Further, in an embodiment, the method (1000) at step (1004) may include determining whether signal strength as perceived by UEs associated with the identified number of the users (Rx) is greater than a threshold for the signal strength (ThRx) (also referred as a third threshold herein). In an embodiment, if the one or more offloading criteria are not met, the method (1000) continues (1006) to analyse the data collected by the intelligent data collector engine.

At step (1008), the method (1000) may include determining if one or more offloading criteria from step (1004) are met, then offloading is triggered. If one or more offloading criteria are met, the method (1000) may include offloading the identified number of the users from one network to another via the BMOS. Once the offloaded users are moving out of the media content out moving out of the serving area, the method (1000) may include triggering onload (1010), i.e., broadcast stops and unicast resumes.

In an embodiment, as discussed above, the one or more offloading criteria include the identified number of the user equipments being greater than the first threshold. In an embodiment, the one or more offloading criteria include the identified number of the user equipments being subscribed to the system. In an embodiment, the one or more offloading criteria include a bandwidth saved by the identified number of the user equipments being greater than the second threshold. In an embodiment, the one or more offloading criteria include a signal strength of the identified number of the user equipments being greater than the third threshold.

Thereafter, data is continuously tracked and collected by the BMOS to decide whether a media session needs to be offloaded from one network system to another network system without causing any session disruption and without any manual intervention from the end user.

In accordance with the embodiments presented herein, the one or more processor(s) 502 of FIG. 5 of the system (410) may be configured to perform the steps of the method (1000) as described above with reference to FIG. 10.

A person of ordinary skill in the art will readily ascertain that the illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Figure 11:
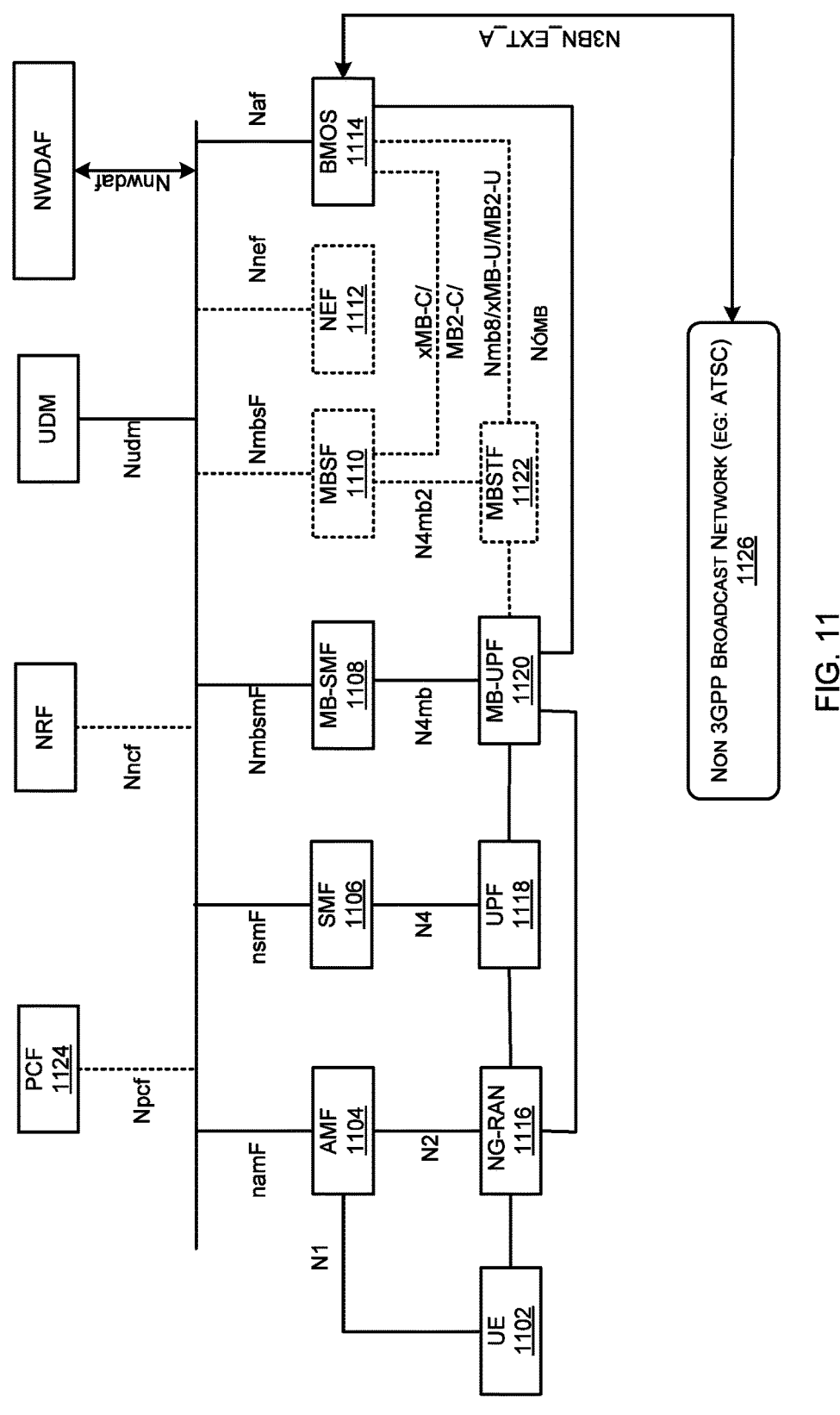
FIG. 11 illustrates an exemplary block diagram representation highlighting one or more interfaces between a plurality of modules and a BMOS system, in accordance with embodiments of the present disclosure.

FIG. 11 illustrates an exemplary block diagram representation (1100) highlighting one or more interfaces between a plurality of modules and a BMOS, in accordance with embodiments of the present disclosure.

As illustrated, a UE (1102) such as 5G smartphones or 5G cellular devices connect over a 5G New Radio Access Network (1116) to the 5G core and further to Data Networks (DN), like the Internet. An AMF (1104) acts as a single-entry point for the UE connection. Based on the service requested by the UE (1102), the AMF (1104) selects a respective Session Management Function (SMF) (1106) for managing the user session. A User Plane Function (UPF) (1118) transports the IP data traffic (user plane) between the UE (1102) and the external networks. A multicast broadcast Server Function (MBSF) (1110) allows the AMF (1104) to manage the UE (1102) and access services of the 5G core. Other functions like the Policy Control Function (PCF) (1124) provide policy control framework, applying policy decisions, and accessing subscription information, to govern the network behaviour.

In an embodiment, N3BN_EXT_A is an interface that may be defined between BMOS (1114) and non-3GPP broadcast network (1126). The BMOS (1114) interfaces with the 3GPP system like any other Application Server (AS) does.

Figure 12:
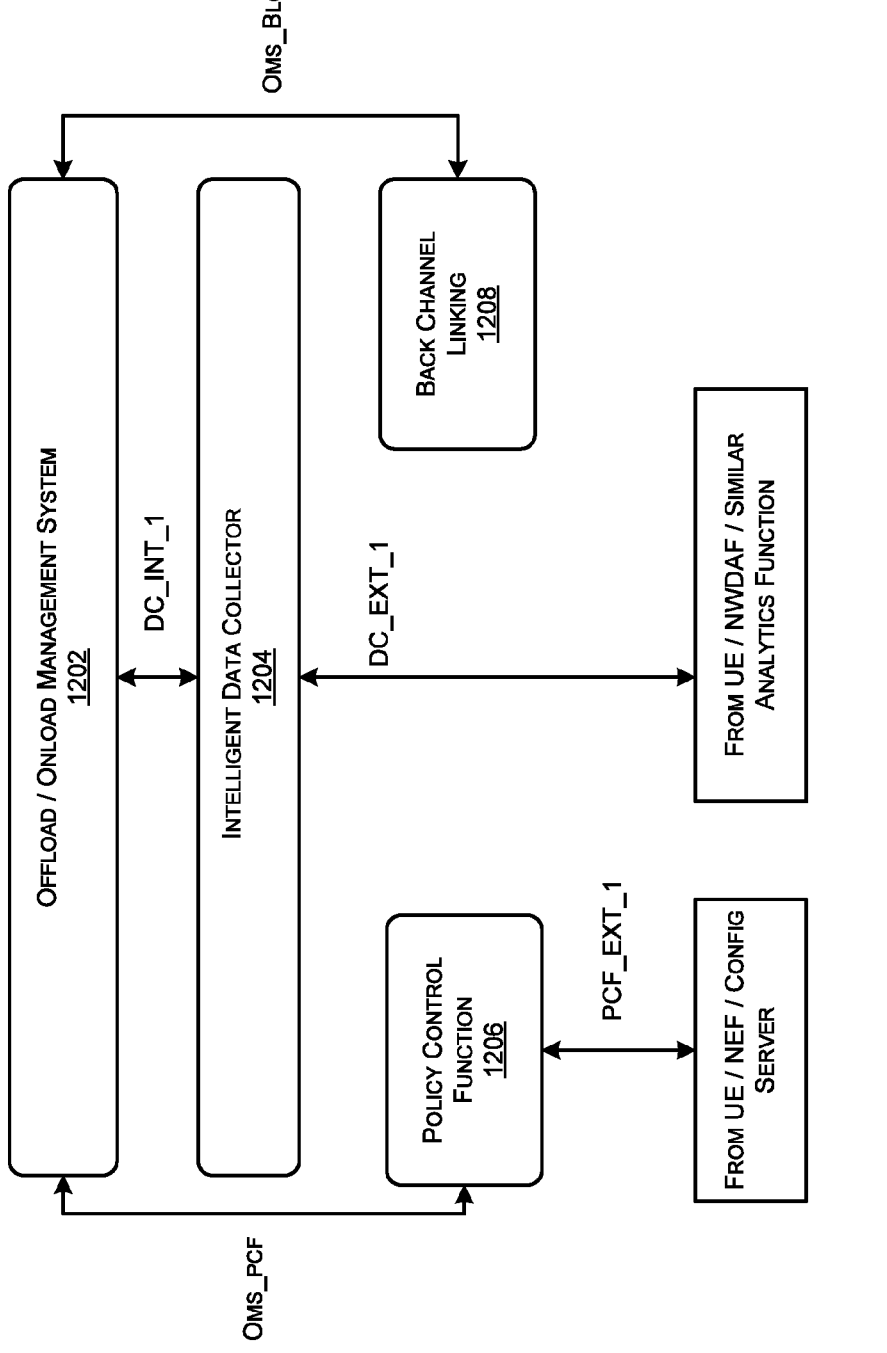
FIG. 12 illustrates another exemplary block diagram representation highlighting one or more interfaces between a plurality of modules and a BMOS system, in accordance with embodiments of the present disclosure.
Figure 12:
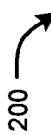

FIG. 12 illustrates another exemplary block diagram representation (1200) highlighting one or more interfaces between a plurality of modules and a BMOS system, in accordance with embodiments of the present disclosure.

As illustrated, in an embodiment, a first interface, DC_EXT_1 is an interface between an intelligent data collector (1204) and all the external entities such as network data analytics function (NWDAF) in the 3GPP system, UE, or any other similar analytics system. In an embodiment, a second interface, a DC_INT_1 is an interface between the intelligent data collector (1204) and an offload/onload management system (1202). In an embodiment, a third interface, Oms_Pcf is an interface between the offload/onload management system (1202) and a policy control function (PCF) (1206). For example, the PCF (1206) dictates offload/onload management settings to be applied based on certain policies configured either based on end user inputs or based on configuration server settings. In an embodiment, a fourth interface, Oms_Blc is an interface between the offload/onload management system (1202) and a back channel linking module (1208) to understand an association between UL data and multicast/broadcast session, and by which user. In an embodiment, a fifth interface, PCF_EXT_1 is an interface between the PCF (1206) and external agents, such as UE, configuration server, etc.

In an embodiment, all the above-mentioned interfaces are service-based APIs that are defined for purpose of sharing a report and for maintaining multiple configurations over a control path.

FIGS. 13A-13G illustrate exemplary sequence diagram representations for different call flows in a network implementing the proposed method, such as the method (1000) of FIG. 10, in accordance with embodiments of the present disclosure.

Figure 13A:
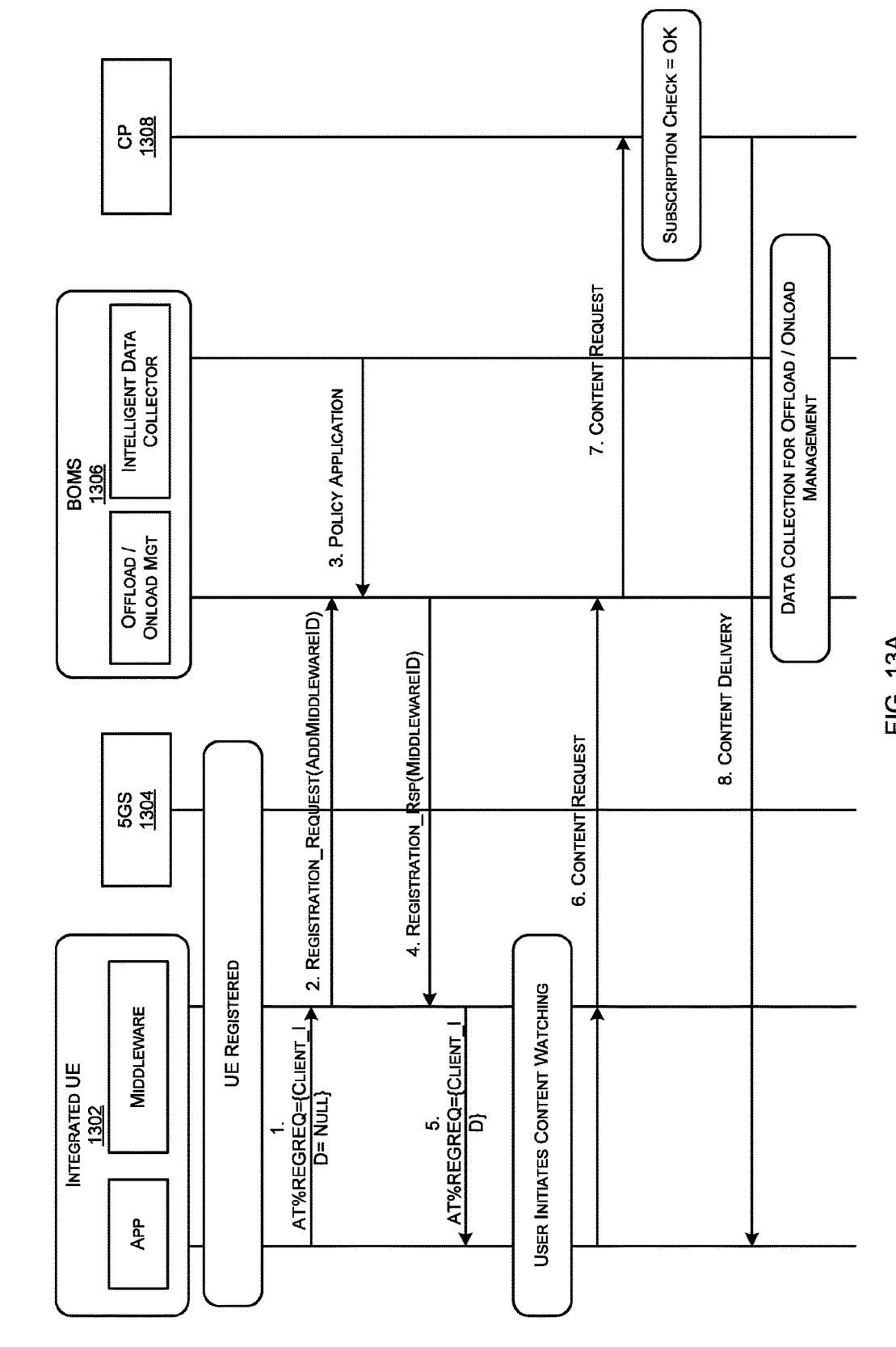
FIGS. 13A-13G illustrate exemplary sequence diagram representations for different call flows in a network implementing the proposed method, in accordance with embodiments of the present disclosure.

For example, FIG. 13A illustrates a sequence diagram (1300-1) for offload/onload management registration and policy making. In particular, once a UE (1302) has registered to a unicast broadcast network, such as (1304), the UE (1302) sends a registration request to a BOMS platform (1306), either upon power on or upon combing back to in-service from Out of Service. The BOMS (1306), in particular, assigns a unique ID and a middleware ID to the UE (1302) and responds the same to the UE (1302) in a response. Thereafter, an end user associated with the UE (1302) initiates content watching which may comprise a content request being sent from the UE (1302) to a content provider (CP) (1308) via the BOMS (1306). In response, the CP (1308) checks whether the UE (1302) is subscribed to watch the media content. Once confirmed, the CP (1308) provides the requested media content to the UE (1302) via the BOMS (1306) through the unicast broadband network (1304). Simultaneously, the BOMS (1306) and in particular, an intelligent data collector engine in BOMS (1306), collects necessary data required for offload/onload management.

Figure 13B:
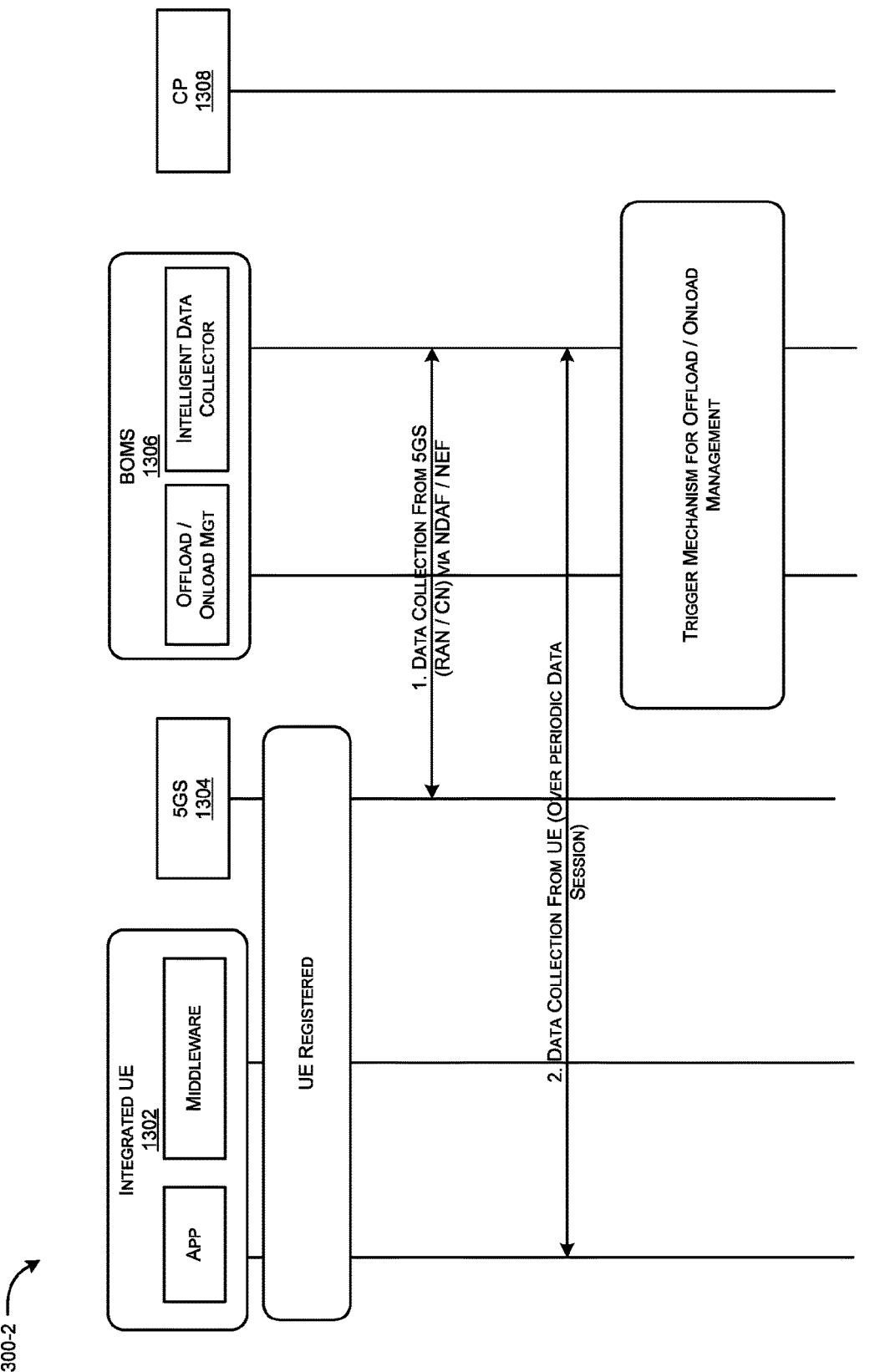

FIG. 13B illustrates a sequence diagram (1300-2) for data collection performed by an intelligent data collector engine of the BMOS (1306). In particular, the intelligent data collector engine collects data from a network, such as (1304) and from an integrated UE (1302) over periodic data sessions. Based on the data collected, the BMOS (1306) decides and triggers offload/onload management.

Figure 13C:
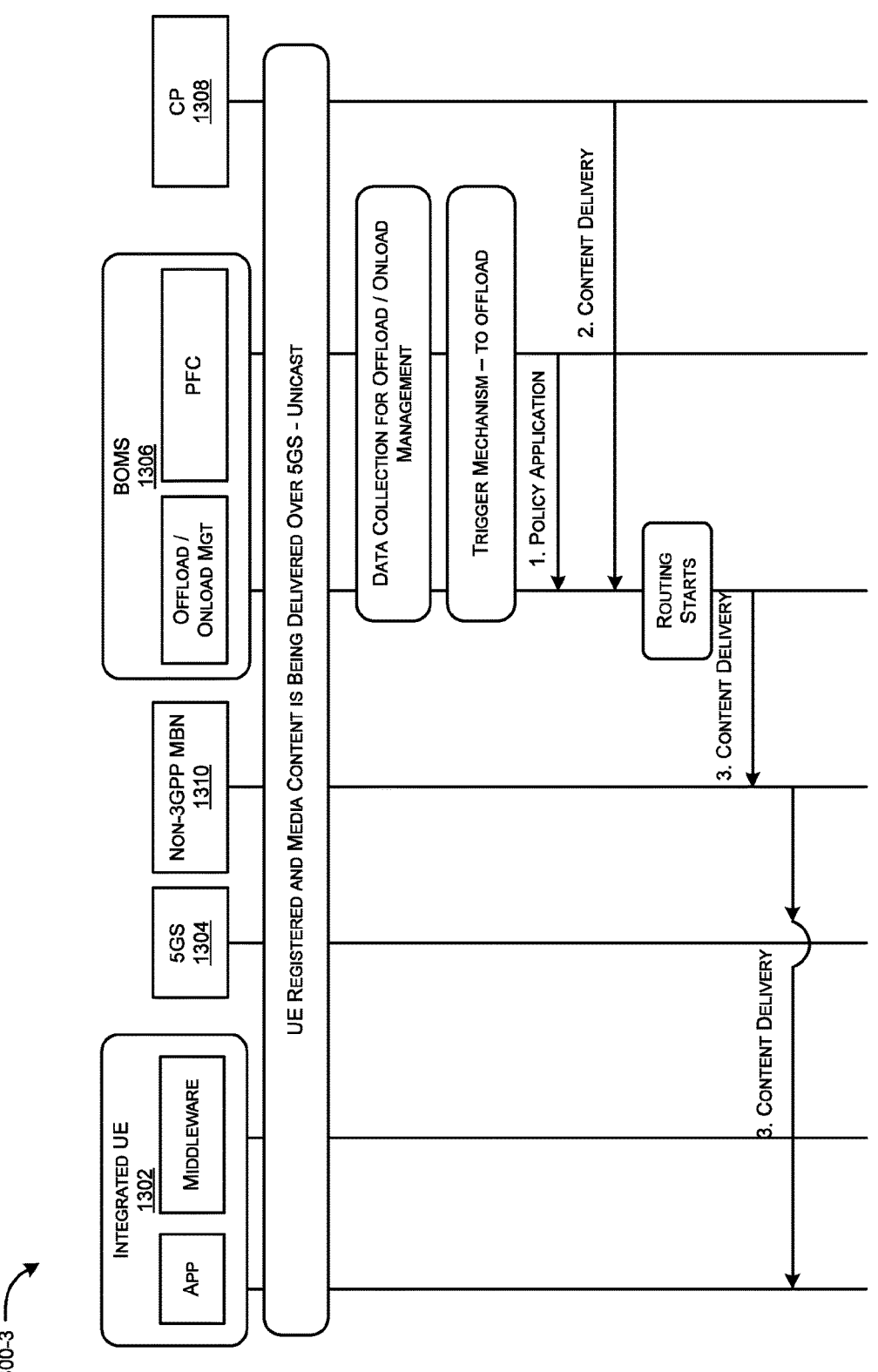

Further, FIG. 13C illustrates a sequence diagram (1300-3) for offloading data session from a 3GPP unicast network to a non-3GPP broadcast network. As illustrated, media content is being delivered from the CP (1308) to the UE (1302) over 3GPP unicast network (1304). Based on the data collected, the BOMS (1306) decides to trigger offload mechanism, such that the media content is provided via the BOMS (1306) to a non-3GPP broadcast network (1310) which routes the media content to the UE (1302). A person of ordinary skill in the art will understand that the method by which the BOMS (1306) decides to trigger the offload mechanism has been discussed in detail with reference to previous figures, and may not be described again for the sake of brevity.

Figure 13D:
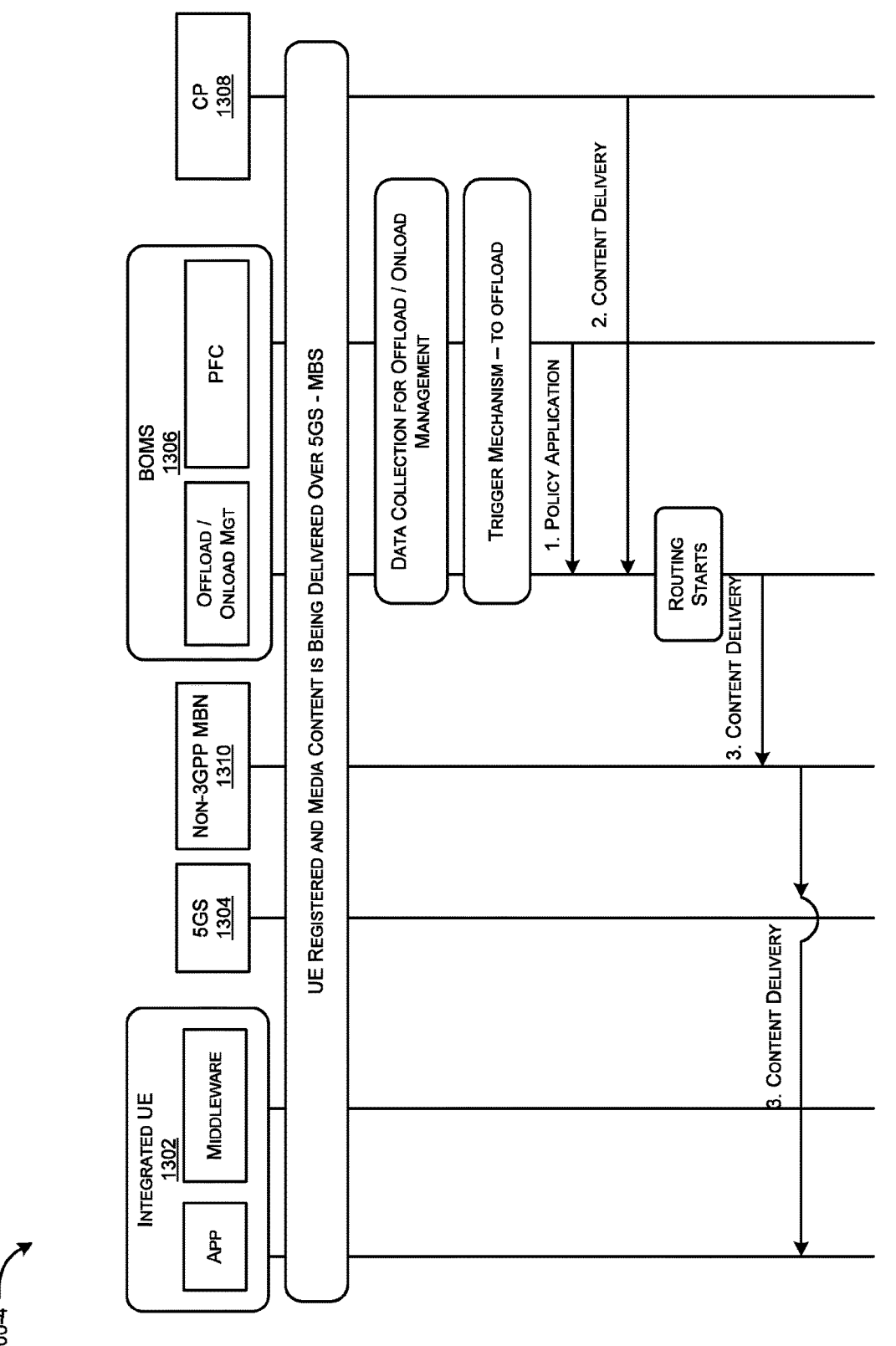

On similar lines, FIG. 13D illustrates a sequence diagram (1300-4) for offloading data session from a 3GPP broadcast network to a non-3GPP broadcast network. As illustrated, media content is being delivered from the CP (1308) to the UE (1302) over 3GPP broadcast network (1304). Based on the data collected, the BOMS (1306) decides to trigger offload mechanism, such that the media content is provided from the BOMS (1306) to a non-3GPP broadcast network (1310) which routes the media content to the UE (1302).

Figure 13E:
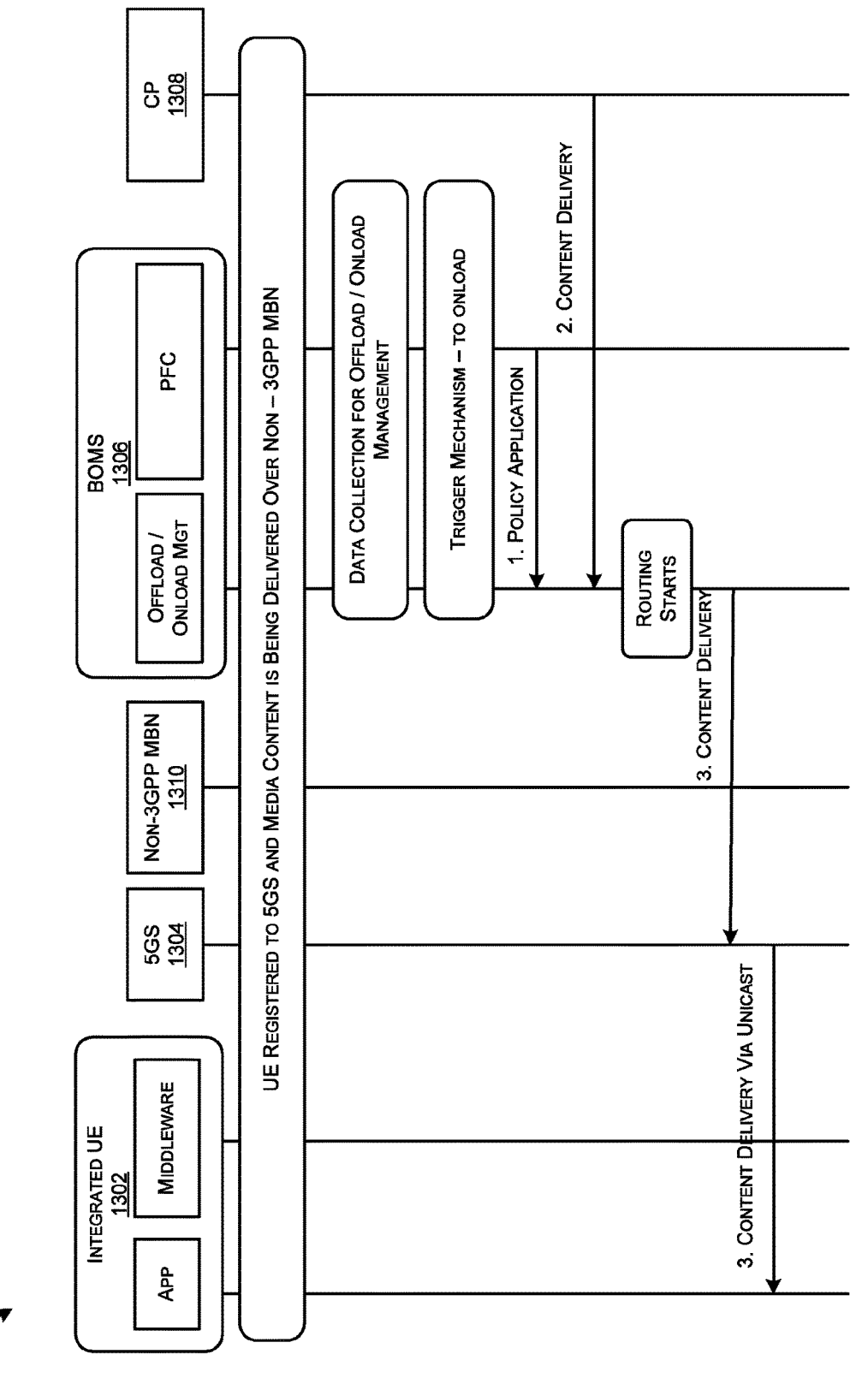

Similarly, FIG. 13E illustrates a sequence diagram (1300-5) for offloading data session from a non-3GPP broadcast network to a 3GPP unicast network. As illustrated, media content is being delivered from the CP (1308) to the UE (1302) over non-3GPP broadcast network (1310). Based on the data collected, the BOMS (1306) decides to trigger offload mechanism, such that the media content is provided from the BOMS (1306) to a 3GPP unicast network (1304) which routes the media content to the UE (1302) via unicast.

Figure 13F:
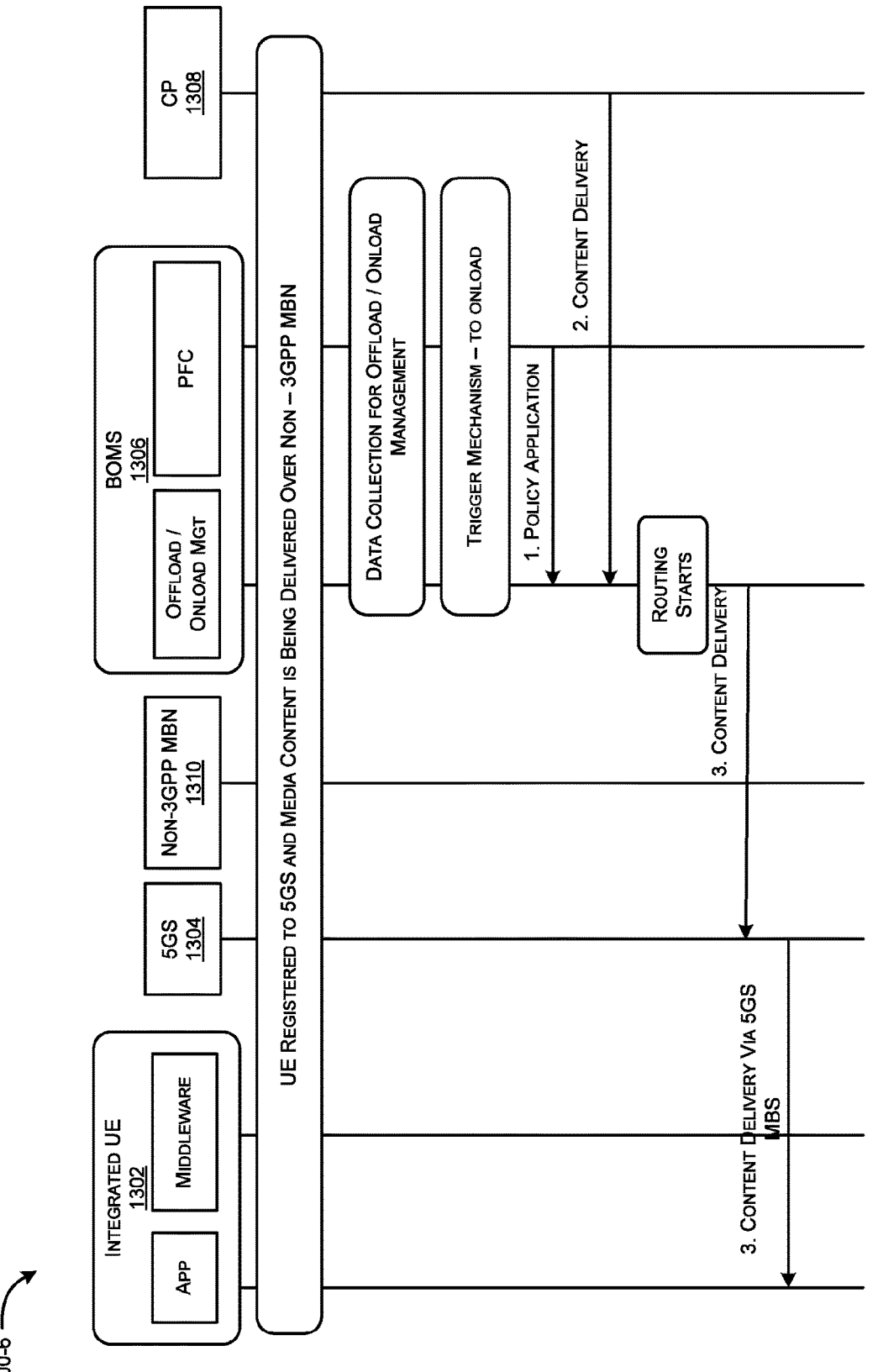

Further, FIG. 13F illustrates a sequence diagram (1300-6) for offloading data session from a non-3GPP broadcast network to a 3GPP broadcast network. As illustrated, media content is being delivered from the CP (1308) to the UE (1302) over non-3GPP broadcast network (1310). Based on the data collected, the BOMS (1306) decides to trigger offload mechanism, such that the media content is provided from the BOMS (1306) to a 3GPP broadcast network (1304) which routes the media content to the UE (1302).

Figure 13G:
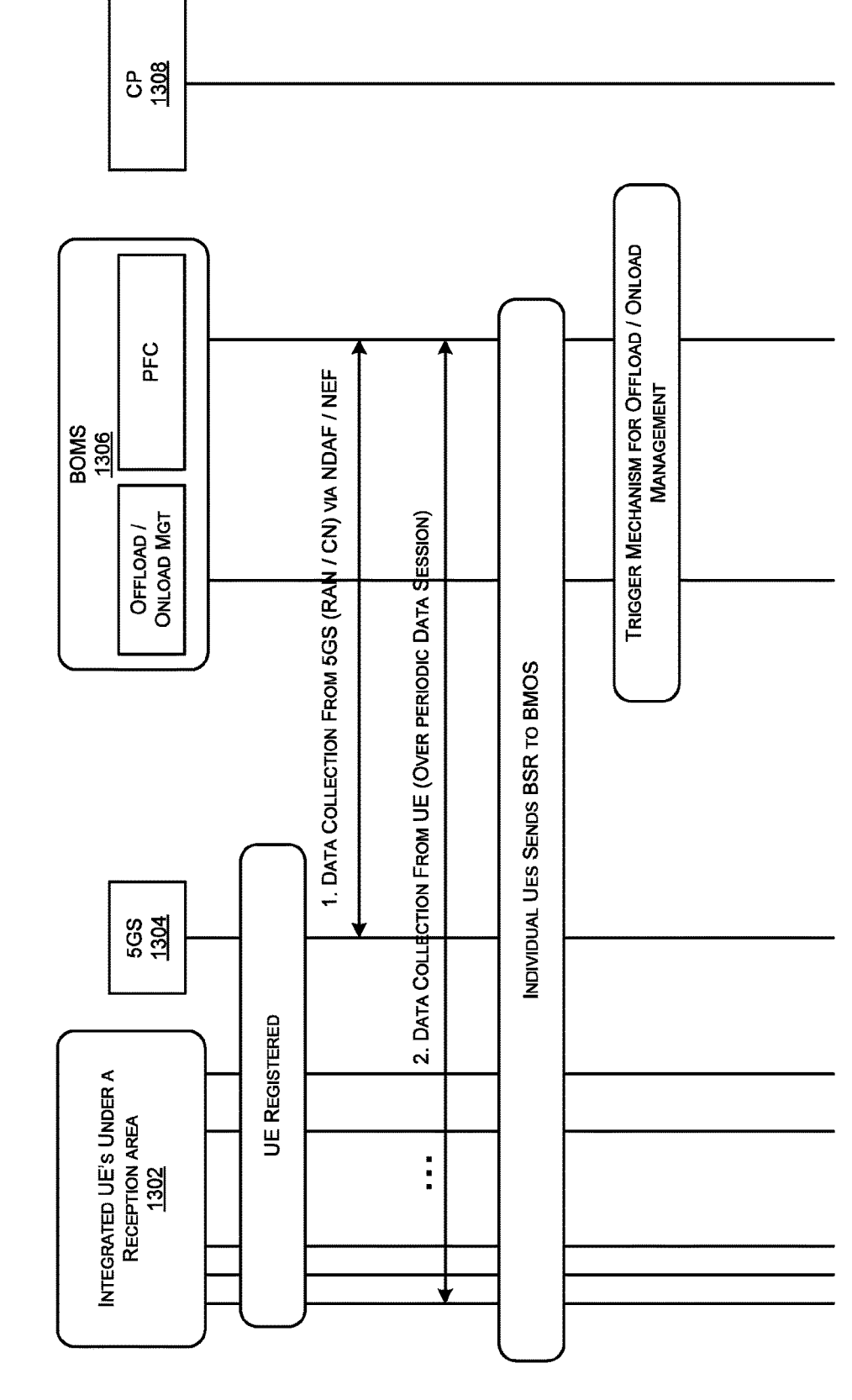

Referring to FIG. 13G, a sequence diagram (1300-7) for sharing buffer status report is illustrated. As illustrated, the UE (1302) registers to a BOMS (1306) platform upon power on or upon coming back to in-service from Out of Service. The registration is done over a unicast broadband network (1304). Further, the intelligent data collector engine of the BOMS (1306) collects data from the unicast broadband network (1304) as well as from the UE (1302) over periodic data sessions. In an embodiment, all UEs send a respective buffer status report to the BOMS (1306), based on which the BOMS (1306) decides whether or not to offload a data session from one network system to another network system.

While considerable emphasis has been placed herein on the preferred embodiments, it will be appreciated that many embodiments can be made and that many changes can be made in the preferred embodiments without departing from the principles of the disclosure. These and other changes in the preferred embodiments of the disclosure will be apparent to those skilled in the art from the disclosure herein, whereby it is to be distinctly understood that the foregoing descriptive matter to be implemented merely as illustrative of the disclosure and not as limitation.

ADVANTAGES OF THE DISCLOSURE

The present disclosure provides a system and method to offload or onload media sessions across multiple channels or access networks.

The present disclosure provides a system and method to switch the network systems intelligently and seamlessly without any manual intervention and provide continued broadcast/multicast services to end users.

The present disclosure enables efficient use of licensed radio resources.

The present disclosure provides an effective system and method to save radio bandwidth corresponding to offloading of users.

The present disclosure provides better Quality of Service to end users.

We claim:

1. A system for offloading user equipments, said system comprising:

one or more processors; and a memory operatively coupled to the one or more processors, wherein the memory comprises processor-executable instructions, which on execution, causes the one or more processors to:

collect data parameters from the user equipments, wherein the data parameters comprise: a first count of the number of user equipments in a particular area watching a particular broadcast or multicast content, user equipments that are subscribed to the system, a first threshold corresponding to a second count of the number of user equipments that can save a particular bandwidth, a second threshold corresponding to the saved bandwidth, and a third threshold corresponding to signal strength required for the offloading, and wherein the user equipments are communicatively coupled to the system;

identify the number of user equipments to be offloaded based on the data parameters;

determine whether the identified number of user equipments meet one or more offloading criteria; and trigger the offloading of the identified number of user equipments from a first network system to a second network system based on a determination that the identified number of user equipments meet the one or more offloading criteria.

2. The system as claimed in claim 1, wherein the one or more offloading criteria comprise the identified number of user equipments being greater than the first threshold.

3. The system as claimed in claim 2, wherein the one or more offloading criteria comprise the identified number of user equipments being subscribed to the system.

4. The system as claimed in claim 3, wherein the one or more offloading criteria comprise a bandwidth saved by the identified number of user equipments being greater than the second threshold.

5. The system as claimed in claim 4, wherein the one or more offloading criteria comprise the signal strength of the identified number of user equipments being greater than the third threshold.

6. The system as claimed in claim 1, wherein the first network system comprises a cellular network system, and wherein the second network system comprises a non-cellular network system.

7. The system as claimed in claim 1, wherein the memory comprises processor-executable instructions, which on execution, causes the one or more processors to monitor media content of the user equipment; and decide on type of advertisements to be displayed on the user equipment based on the monitored media content.

8. The system as claimed in claim 1, wherein the memory comprises processor-executable instructions, which on execution, causes the one or more processors to trigger the offloading by being configured to relay media content, via the system, to the identified number of user equipments.

9. The system as claimed in claim 1, wherein the memory comprises processor-executable instructions, which on execution, causes the one or more processors to trigger the offloading by being configured to communicate an end point node to a content provider of media content for content transmission to the identified number of user equipments.

10. The system as claimed in claim 1, wherein the memory comprises processor-executable instructions, which on execution, causes the one or more processors to assign a unique identifier to each of the identified number of user equipments-(402) upon successful subscription to the system.

11. A method for offloading user equipments, said method comprising:

collecting, by a processor, data parameters from the user equipments in a first network system, wherein the data parameters comprise: a first count of the number of user equipments in a particular area watching a particular broadcast or multicast content, user equipments that are subscribed to a system, a first threshold corresponding to a second count of the number of user equipments that can save a particular bandwidth, a second threshold corresponding to the saved bandwidth, and a third threshold corresponding to signal strength required for the offloading, identifying, by the processor, the number of user equipments in the first network system to be offloaded based on the data parameters;

determining, by the processor, whether the identified number of user equipments meet one or more offloading criteria; and triggering, by the processor, the offloading of the identified number of user equipments from the first network system to a second network system based on determining that the identified number of user equipments meet the one or more offloading criteria.

12. The method as claimed in claim 11, wherein the one or more offloading criteria comprise the identified number of user equipments being greater than the first threshold.

13. The method as claimed in claim 12, wherein the one or more offloading criteria comprise the identified number of user equipments being subscribed to a broadcast or multicast offload/onload system.

14. The method as claimed in claim 13, wherein the one or more offloading criteria comprise a bandwidth saved by the identified number of user equipments being greater than the second threshold.

15. The method as claimed in claim 14, wherein the one or more offloading criteria comprise the signal strength of the identified number of user equipments being greater than the third threshold.

16. The method as claimed in claim 11, wherein triggering, by the processor, the offloading comprises relaying, by the processor, media content via a broadcast or multicast offload/onload system to the identified number of user equipments.

17. The method as claimed in claim 11, wherein triggering, by the processor, the offloading comprises communicating, by the processor, an end point node to a content provider of media content for content transmission to the identified number of user equipments.

18. A user equipment in a first network system, said user equipment comprising:

one or more processors communicatively coupled to an offloading system, wherein the one or more processors are configured to:

transmit a subscription request to the offloading system;

receive a subscription response from the offloading system, wherein the subscription response comprises a unique identifier associated to the user equipment; and in response to reception of the subscription response, provide data parameters to the offloading system, wherein the data parameters comprise: a first count of the number of user equipments in a particular area watching a particular broadcast or multicast content, user equipments that are subscribed to the system, a first threshold corresponding to a second count of the number of user equipments that can save a particular bandwidth, a second threshold corresponding to the saved bandwidth, and a third threshold corresponding to signal strength required for the offloading, wherein the offloading system comprises a processor configured to:

identify the user equipment for offloading based on the data parameters;

determine whether the user equipment meets one or more offloading criteria; and trigger the offloading of the user equipment from the first network system to a second network system based on a determination that the user equipment meets the one or more offloading criteria.

19. A non-transitory computer readable medium comprising processor-executable instructions that cause a processor to:

collect data parameters from user equipments, wherein the data parameters comprise: a first count of the number of user equipments in a particular area watching a particular broadcast or multicast content, user equipments that are subscribed to the system, a first threshold corresponding to a second count of the number of user equipments that can save a particular bandwidth, a second threshold corresponding to the saved bandwidth, and a third threshold corresponding to signal strength required for the offloading;

identify a number of user equipments to be offloaded based on the one or more data parameters;

determine whether the identified number of user equipments meet one or more offloading criteria; and trigger the offloading of the identified number of user equipments from a first network system to a second network system based on a determination that the identified number of user equipments meet the one or more offloading criteria.

\* \* \* \* \*